United States Patent
Seo et al.

(10) Patent No.: US 11,252,733 B2
(45) Date of Patent: Feb. 15, 2022

(54) METHOD OF RECEIVING SIGNAL IN CORESET OF WIRELESS COMMUNICATION SYSTEM AND APPARATUS USING THE METHOD

(71) Applicant: LG Electronics Inc., Seoul (KR)

(72) Inventors: Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 89 days.

(21) Appl. No.: 16/533,353

(22) Filed: Aug. 6, 2019

(65) Prior Publication Data
US 2020/0045709 A1    Feb. 6, 2020

(30) Foreign Application Priority Data

Aug. 6, 2018 (KR) .................. 10-2018-0091354
Oct. 10, 2018 (KR) .................. 10-2018-0120464

(51) Int. Cl.
*H04W 72/04* (2009.01)
*H04W 72/00* (2009.01)
(Continued)

(52) U.S. Cl.
CPC ....... *H04W 72/0493* (2013.01); *H04L 1/0026* (2013.01); *H04L 5/0051* (2013.01);
(Continued)

(58) Field of Classification Search
CPC ... H04B 7/0617; H04L 1/0026; H04L 1/0045; H04L 1/0072; H04L 5/0048;
(Continued)

(56) References Cited

U.S. PATENT DOCUMENTS

2018/0063865 A1    3/2018  Islam et al.
2019/0141693 A1*   5/2019  Guo .................. H04L 5/0053
(Continued)

FOREIGN PATENT DOCUMENTS

CN      108092754       5/2018
KR      20170128107    11/2017
WO      WO2018128376    7/2018

OTHER PUBLICATIONS

Koskela et al.. "Configuration Off Ailure Detection Reference Signals", Apr. 13, 2018, Nokia Technologies Oy, U.S. Appl. No. 62/657,125, Total p. 32 (Year: 2018).*

(Continued)

*Primary Examiner* — Shah M Rahman
(74) *Attorney, Agent, or Firm* — Fish & Richardson P.C.

(57) ABSTRACT

Provided are a method for receiving a signal in a control resource set (CORESET) of a wireless communication system and a user equipment (UE) using the method. The method includes receiving a radio resource control (RRC) signal including a plurality of transmission configuration indicator (TCI) states, receiving a medium access control (MAC) control element (CE) informing one of the plurality of TCI states and receiving a signal in the CORESET based on the one TCI state. When the CORESET is CORESET #0, the one TCI state is related with a reference signal associated with a synchronization signal/physical broadcast channel block (SSB).

12 Claims, 26 Drawing Sheets

(51) Int. Cl.
  *H04W 80/02* (2009.01)
  *H04L 5/00* (2006.01)
  *H04W 56/00* (2009.01)
  *H04L 1/00* (2006.01)
  *H04L 5/10* (2006.01)
  *H04W 76/27* (2018.01)

(52) U.S. Cl.
  CPC .............. *H04L 5/10* (2013.01); *H04W 56/001* (2013.01); *H04W 72/005* (2013.01); *H04W 76/27* (2018.02); *H04W 80/02* (2013.01)

(58) Field of Classification Search
  CPC ...... H04L 5/0051; H04L 5/10; H04W 56/001; H04W 72/005; H04W 72/0493; H04W 76/27; H04W 80/02
  See application file for complete search history.

(56) References Cited

U.S. PATENT DOCUMENTS

| | | | |
|---|---|---|---|
| 2019/0222289 A1* | 7/2019 | John Wilson | H04L 5/0073 |
| 2019/0261195 A1* | 8/2019 | Cheng | H04W 8/22 |
| 2019/0281587 A1* | 9/2019 | Zhang | H04L 5/0044 |
| 2019/0320333 A1* | 10/2019 | Koskela | H04B 7/0617 |
| 2019/0342907 A1* | 11/2019 | Huang | H04L 5/0053 |
| 2019/0349964 A1* | 11/2019 | Liou | H04W 72/1284 |
| 2019/0364561 A1* | 11/2019 | Xiong | H04W 76/27 |
| 2019/0373450 A1* | 12/2019 | Zhou | H04W 48/12 |
| 2020/0045745 A1* | 2/2020 | Cirik | H04W 76/27 |
| 2020/0221428 A1* | 7/2020 | Moon | H04B 7/024 |
| 2020/0280409 A1* | 9/2020 | Grant | H04L 5/0023 |
| 2020/0288479 A1* | 9/2020 | Xi | H04B 7/02 |

OTHER PUBLICATIONS

Guo et al., "Method and apparatus for beam indication in next generation wireless systems", May 22, 2018, Samsung Electronics Co., Ltd., U.S. Appl. No. 62/674,676, Total p. 26 (Year: 2018).*

Koskela et al., "User Equipment Receiver Spatial Filter Configuration During Secondary Cell Beam Failure Recovery, Apr. 5, 2018, Nokia Technologies Oy, U.S. Appl. No. 62/653,001, Total p. 31" (Year: 2018).*

3GPP RAN1, "List of RAN1 agreements in RAN1#92bis 93_v1", Apr. 2018, 3GPP.org, Status Report to TSG RP-181217, Jun. 15, 2018, pp. 1, 29-31, Total p. 4 (Year: 2018).*

ZTE, Sanechips, "Details and evaluation results on beam indication," R1-1719538, 3GPP TSG RAN WG1 Meeting #91, Reno, USA, Nov. 27-Dec. 1, 2017, 11 pages.

Vivo, "Remaining issues on QCL," R1-1803827, 3GPP TSG RAN WG1 Meeting #92bis, Sanya, China, Apr. 16-20, 2018, 3 pages.

Nokia, Nokia Shanghai Bell, "PDCCH TCI state during HO and in CORESET#0," R2-1810300, 3GPP TSG-RAN WG2 Meeting NR Adhoc 1807, Montreal, Canada, Jul. 2-6, 2018, 3 pages.

Ericsson, "Remaining issues on beam measurements and reporting," R1-1806217, 3GPP TSG-RAN WG1 Meeting #93, Busan, Korean, May 21-25, 2018, 13 pages.

Extended European Search Report in European Appln. No. 19806085.7, dated Jun. 4, 2020, 10 pages.

Vivo, "Remaining issues on beam measurement and reporting," R1-1803817, 3GPP TSG RAN WG1 Meeting #92bis, Sanya, China, Apr. 16-20, 2018, 5 pages.

IN Office Action in Indian Appln. No. 201937047421, dated Mar. 17, 2021, 7 pages (with English translation).

* cited by examiner

METHOD OF RECEIVING SIGNAL IN CORESET OF WIRELESS COMMUNICATION SYSTEM AND APPARATUS USING THE METHOD

CROSS-REFERENCE TO RELATED APPLICATIONS

Pursuant to 35 U.S.C. § 119(e), this application claims the benefit of Korean Patent Application No. 10-2018-0091354, filed on Aug. 6, 2018, and Korean Application No. 10-2018-0120464, filed on Oct. 10, 2018, the contents of which are all hereby incorporated by reference herein in their entirety.

BACKGROUND OF THE INVENTION

Field of the Invention

The present invention relates to wireless communication, and more particularly, to a method of receiving a signal in a CORESET of a wireless communication system and an apparatus using the method.

Related Art

As more and more communication devices require more communication capacity, there is a need for improved mobile broadband communication compared to the existing radio access technology. Further, massive MTC (Machine Type Communications), which provides various services by connecting many devices and objects, is one of the major issues to be considered in the next generation communication. In addition, communication system design considering reliability/latency sensitive service/UE is being discussed. Likewise, the introduction of the next generation radio access technology considering enhanced mobile broadband communication, massive MTC, URLLC (Ultra-Reliable and Low Latency Communication) is discussed. In the present invention, the technology is called New RAT or NR for convenience. NR is also referred to as a fifth generation (5G) system.

In the NR, a UE can receive a control signal using a time/frequency resource called a control resource set (CORESET) which is a part of the system band.

The UE may need information called a transmission configuration indicator (TCI) state for reception of the CORESET. The TCI state may include information needed to determine a receive beam of the CORESET.

On the other hand, among the CORESETs, the CORESET #0 may have characteristics different from those of other CORESETs. For example, CORESET #0 may be provided by a master information block (MIB) transmitted over a physical broadcast channel (PBCH) as part of the initial bandwidth part (BWP) setting. The CORESET #0 may be a CORESET for monitoring a physical downlink control channel (PDCCH) for scheduling a physical downlink shared channel (PDSCH) carrying system information block (SIB 1), and may be used in receiving other system information and additional setting information. On the other hand, another CORESET may be provided by dedicated RRC signaling and may be used to receive UE-specific control information.

Considering these points, there is a need for a method for indicating the TCI state for CORESET #0 and an apparatus using the above method.

SUMMARY OF THE INVENTION

The present invention provides a method for receiving a signal in a CORESET of a wireless communication system and a UE using the method.

In an aspect, provided is a method for receiving a signal in a control resource set (CORESET) of a wireless communication system. The method includes receiving a radio resource control (RRC) signal including a plurality of transmission configuration indicator (TCI) states, receiving a medium access control (MAC) control element (CE) informing one of the plurality of TCI states and receiving a signal in the CORESET based on the one TCI state. When the CORESET is CORESET #0, the one TCI state is related with a reference signal associated with a synchronization signal/physical broadcast channel block (SSB).

The reference signal may be a channel state information reference signal (CSI-RS).

The one TCI state may include information on quasi co-location (QCL) relation between the CSI-RS and a demodulation reference signal (DMRS) port.

Quasi co-location (QCL) information of the reference signal may be determined based on the SSB.

The CORESET #0 may be configured by information which is transmitted through a physical broadcast channel (PBCH).

In another aspect, provided is a user equipment (UE). The UE includes a transceiver configured to transmit and receive a wireless signal and a processor configured to operate in combination with the transceiver. The processor receives a radio resource control (RRC) signal including a plurality of TCI states, receives a medium access control (MAC) control element (CE) informing one of the plurality of TCI states and receives a signal from the CORESET based on the one TCI state. When the CORESET is CORESET #0, the one TCI state is related with a reference signal associated with a synchronization signal/physical broadcast channel block (SSB).

The reference signal may be a channel state information reference signal (CSI-RS).

The one TCI state may include information on quasi co-location (QCL) relation between the CSI-RS and a demodulation reference signal (DMRS) port.

Quasi co-location (QCL) information of the reference signal may be determined based on the SSB.

The CORESET #0 may be set by information which is transmitted through a physical broadcast channel (PBCH).

In still another aspect, provided is a processor for a wireless communication device in a wireless communication system. The processor controlling the wireless communication device to: receive a radio resource control (RRC) signal including a plurality of TCI states, receive a medium access control (MAC) control element (CE) informing one of the TCI states and receive a signal from the CORESET based on the one TCI state. When the CORESET is CORESET #0, the one TCI state is related with a reference signal associated with a synchronization signal/physical broadcast channel block (SSB).

The reference signal may be a channel state information reference signal (CSI-RS).

The one TCI state may include information on quasi co-location (QCL) relation between the CSI-RS and a demodulation reference signal (DMRS) port.

Quasi co-location (QCL) information of the reference signal may be determined based on the SSB.

The CORESET #0 may be set by information which is transmitted through a physical broadcast channel (PBCH).

When the PDCCH is received in the CORESET, the TCI state of the CORESET is provided, it is assumed that the downlink reference signal set by the TCI state and the demodulation reference signal antenna port associated with the PDCCH reception in the CORESET are in quasi co-location (QCL), and the PDCCH is received in the CORESET. However, among the CORESETs, the CORESET #0 may be different from other CORESETs in terms of characteristics/usage/setting method. For example, the CORESET #0 may be set as part of the initial BWP configuring process and set by the MIB containing only limited critical information. In consideration of this characteristic, in the present invention, a further restriction can be imposed on the downlink reference signal set by the TCI state for the CORESET #0. That is, the TCI state for the CORESET #0 may inform the reference signal which is in QCL relation to the synchronization signal/physical broadcast channel block (SSB), to thereby receive the PDCCH in the CORESET #0 based on the QCL characteristics based on SSB.

DESCRIPTION OF EXEMPLARY EMBODIMENTS

Figure 1:
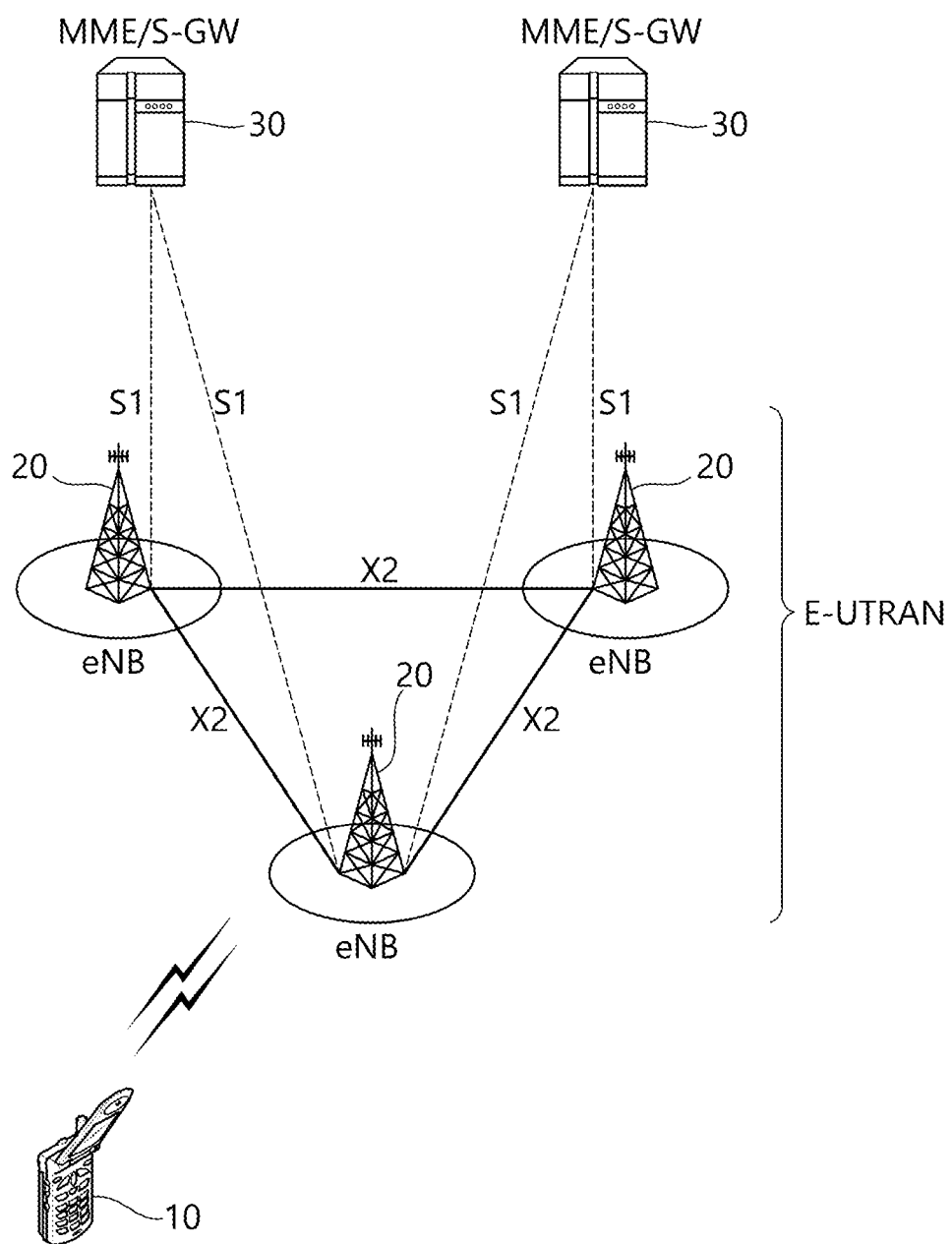
FIG. 1 shows a wireless communication system to which the present invention may be applied.

FIG. 1 shows a wireless communication system to which the present invention may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
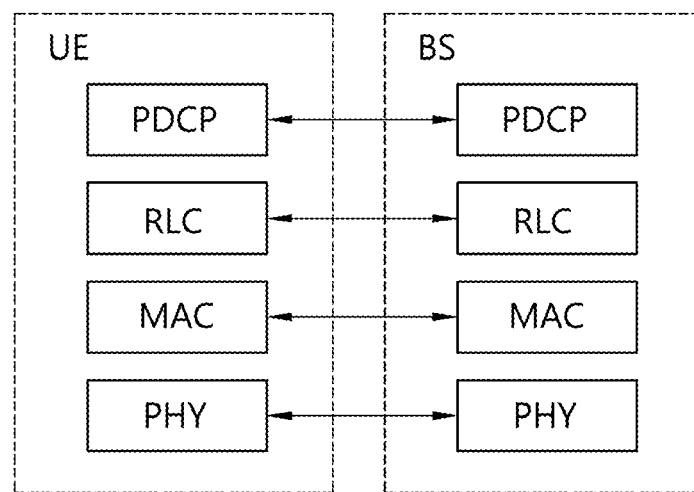
FIG. 2 is a diagram showing a wireless protocol architecture for a user plane.
Figure 3:
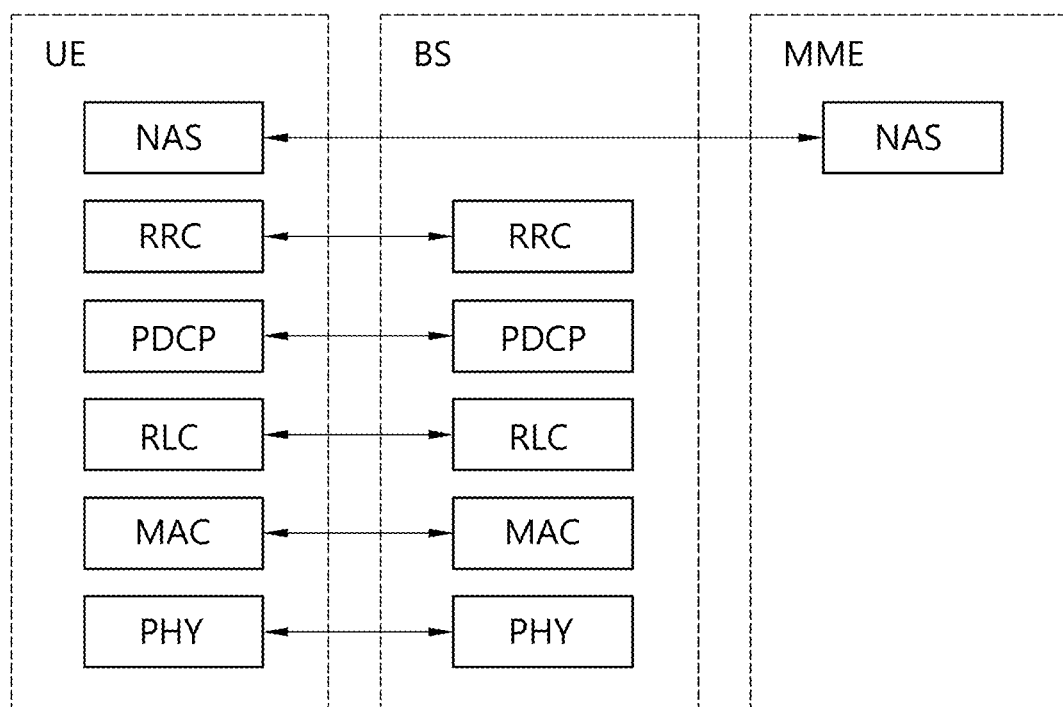
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer(=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present invention for convenience.

Figure 4:
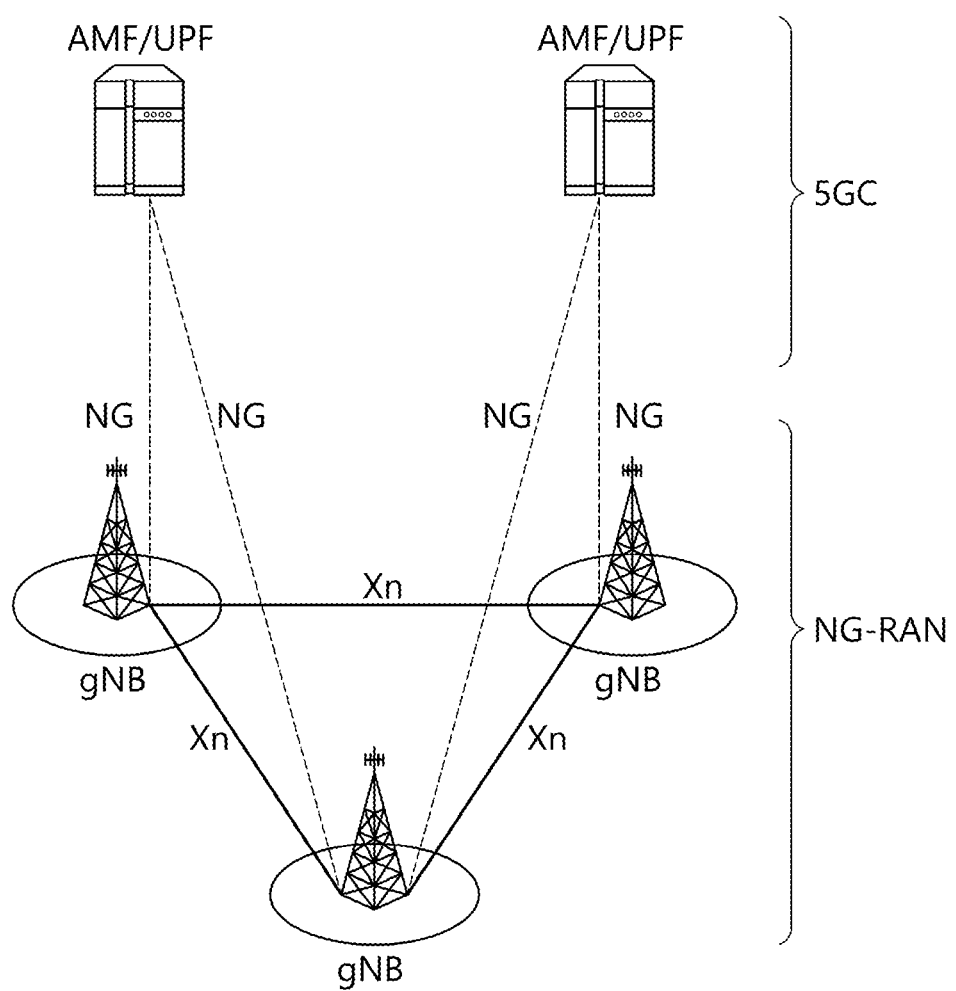
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
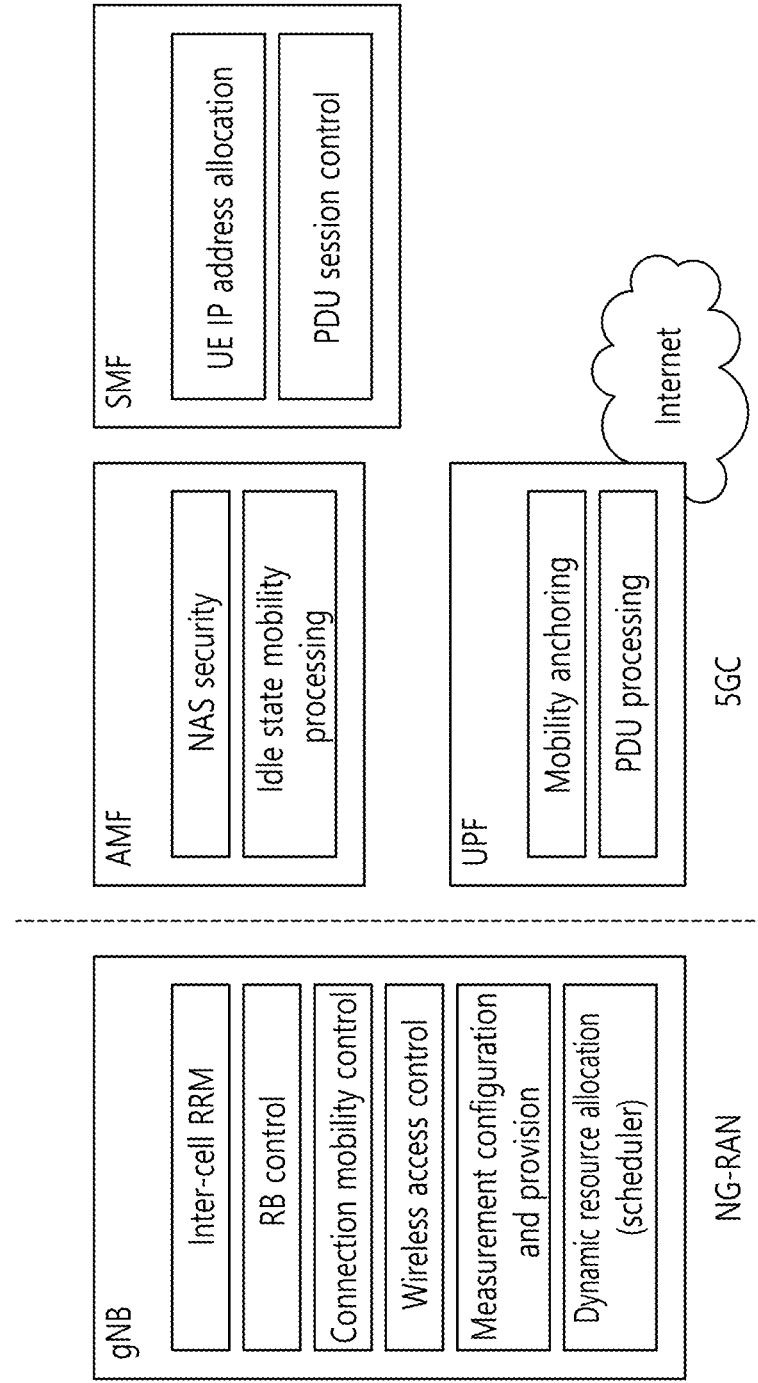
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
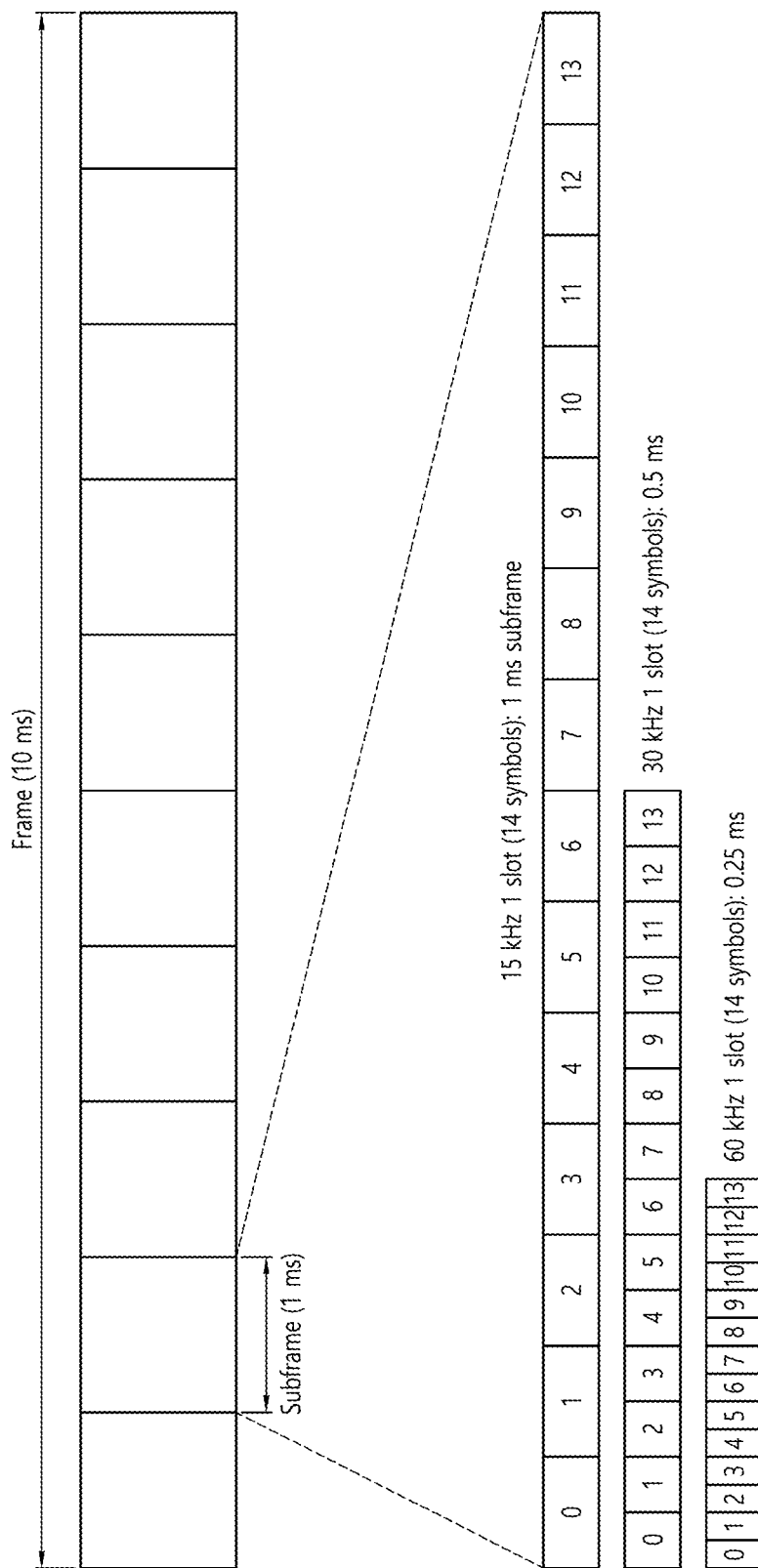
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration μ.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal Extended |
| 3 | 120 | normal |
| 4 | 240 | normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame\mu}_{slot}$ | $N^{subframe\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, μ=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 7:
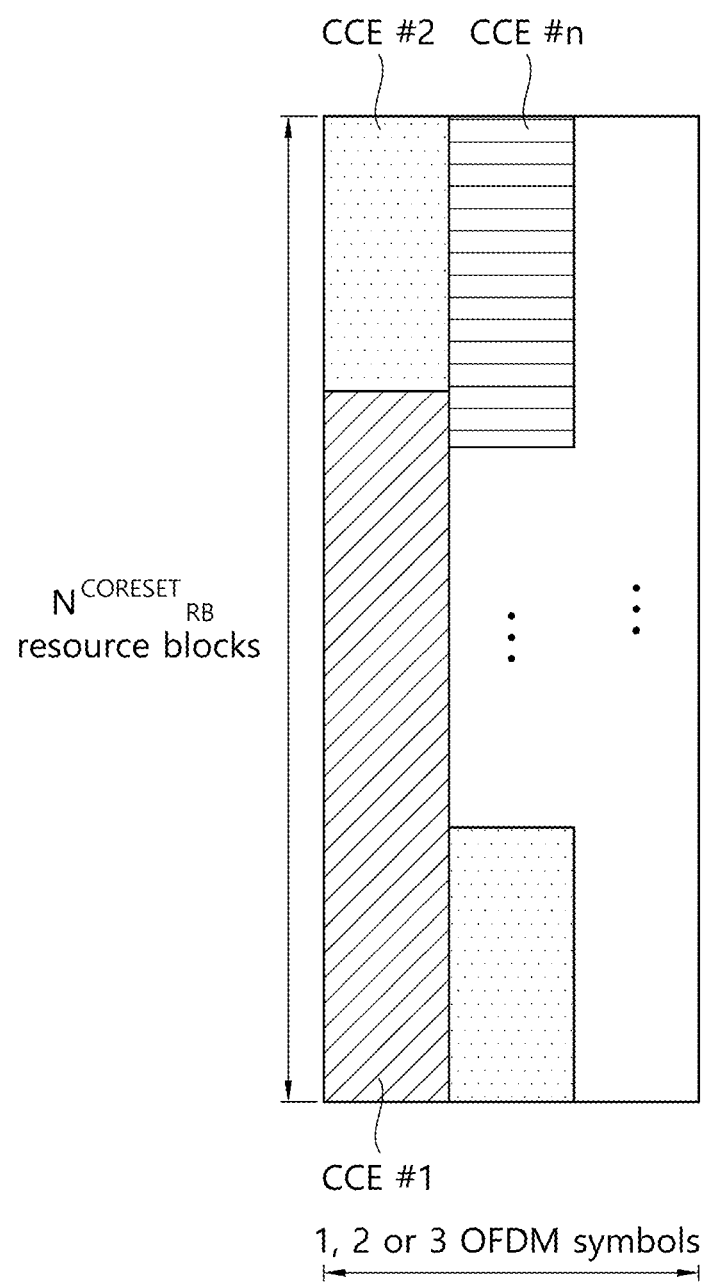
FIG. 7 illustrates CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 8:
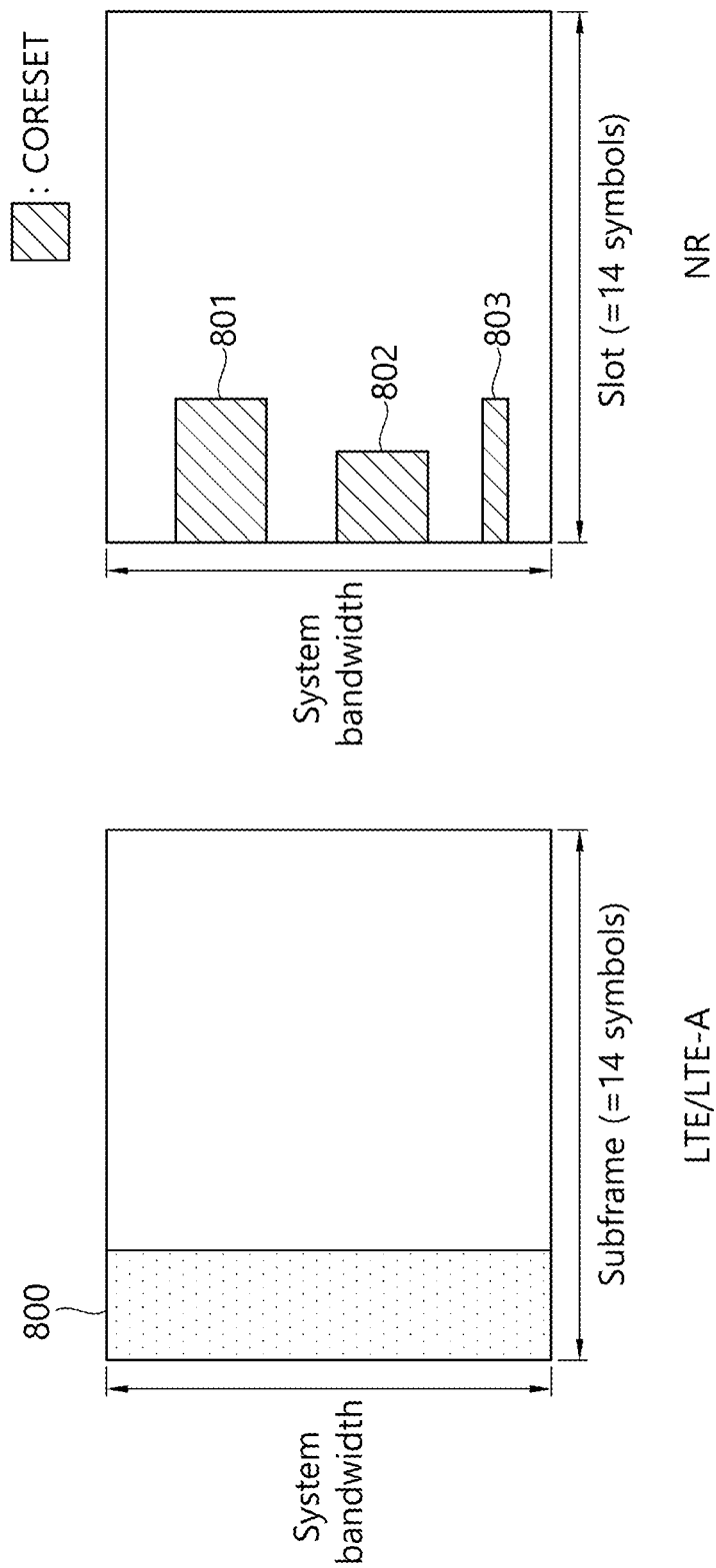
FIG. 8 is a diagram illustrating a difference between a related art control region and the CORESET in NR.

FIG. 8 is a diagram illustrating a difference between a related art control region and the CORESET in NR.

Referring to FIG. 8, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORE-SET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
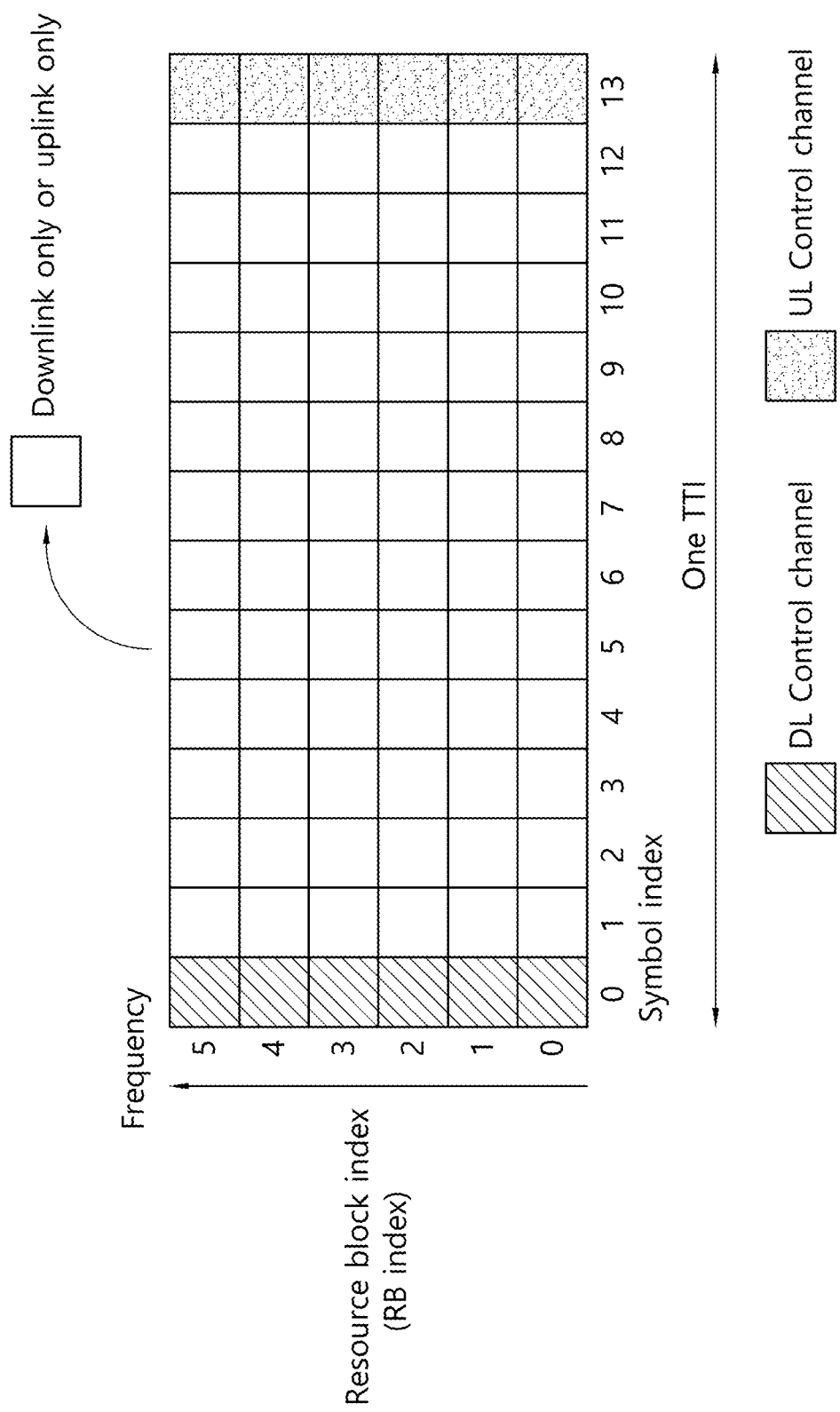
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
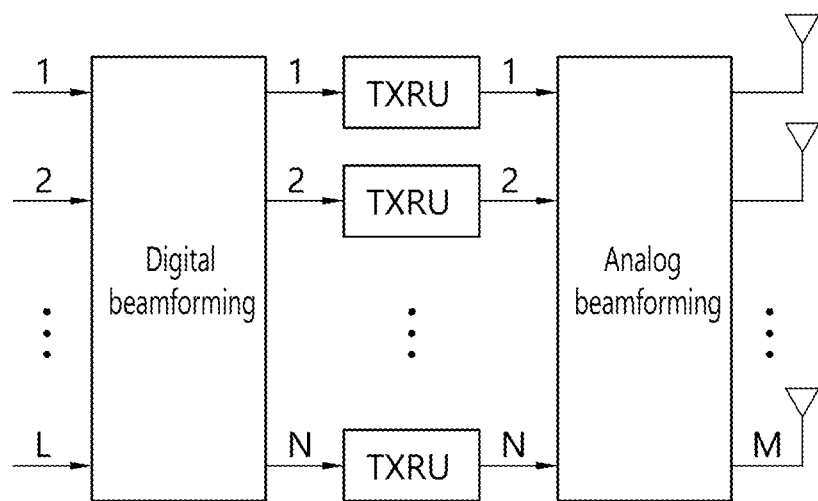
FIG. 10 is an abstract schematic diagram illustrating hybrid beamforming from the viewpoint of TXRUs and physical antennas.

FIG. 10 is an abstract schematic diagram illustrating hybrid beamforming from the viewpoint of TXRUs and physical antennas.

In FIG. 10, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 10, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
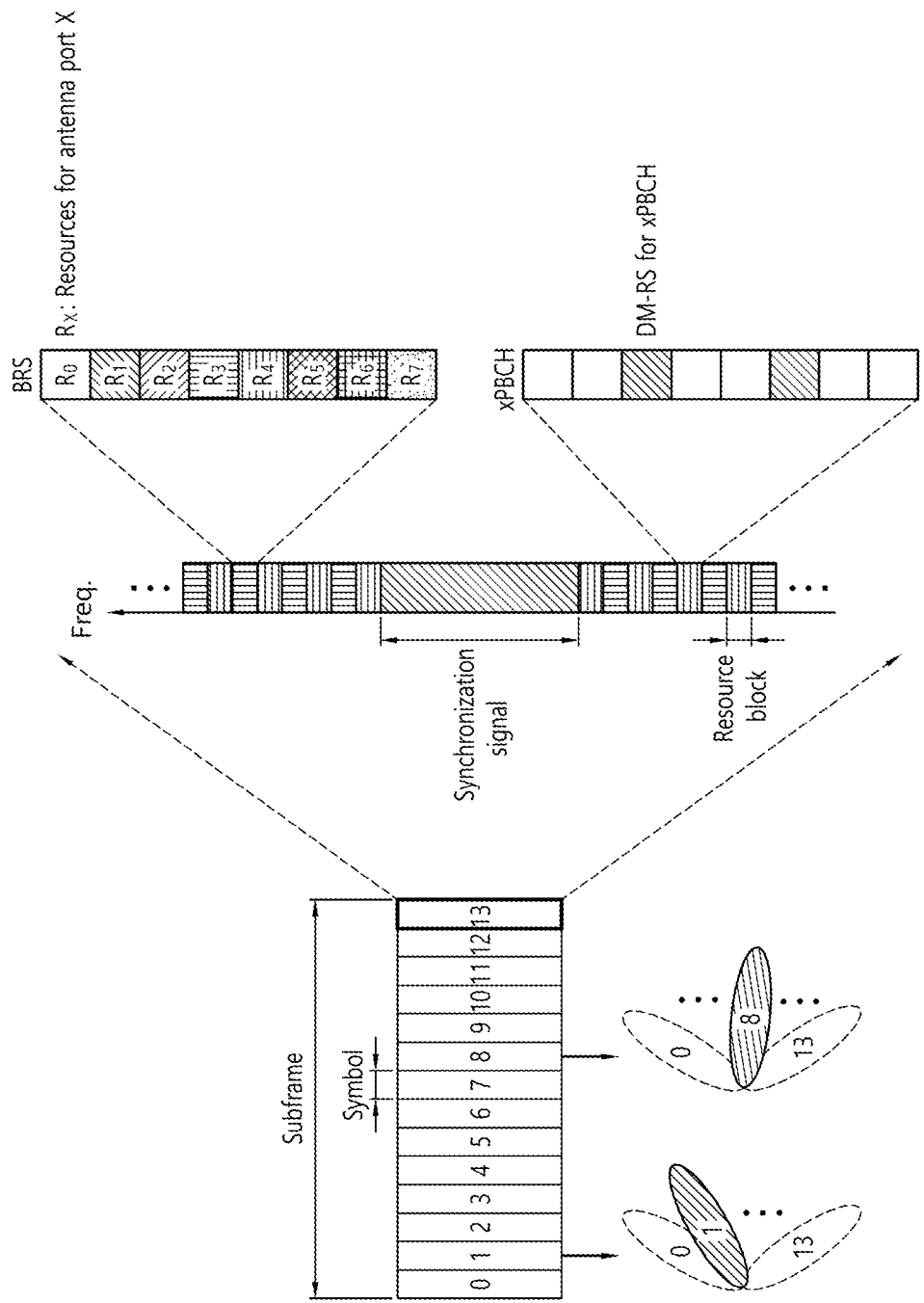
FIG. 11 illustrates the beam sweeping operation for a synchronization signal and system information in a downlink (DL) transmission procedure.

FIG. 11 illustrates the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

Figure 12:
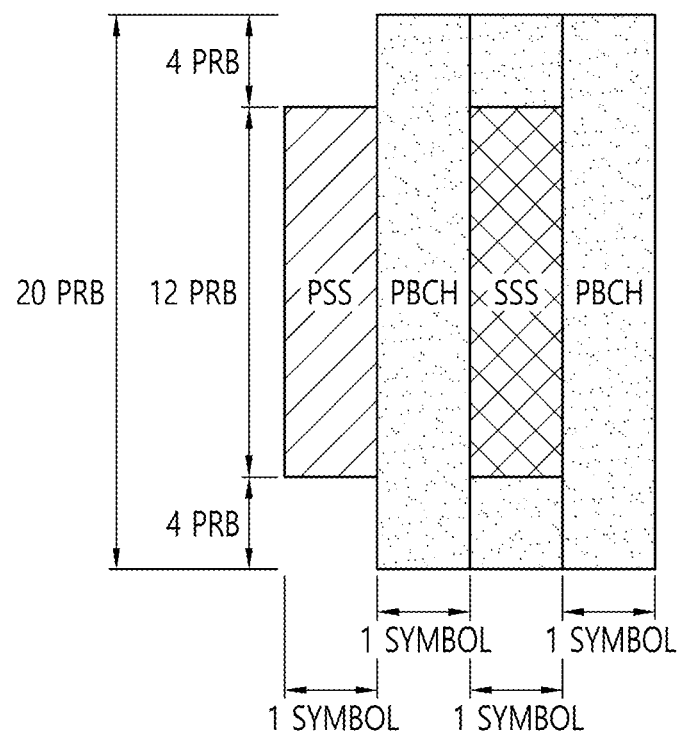
FIG. 12 illustrates a synchronization signal block (SSB) in NR.

FIG. 12 illustrates a synchronization signal block (SSB) in NR.

Referring to FIG. 12, in NR, a synchronization signal block (SSB(=synchronization signal and physical broadcast channel (PBCH)) may be composed of four OFDM symbols in the time domain, numbered in the ascending order from 0 to 3 within the SSB; and a primary synchronization signal (PSS), secondary synchronization signal (SSS), and PBCH associated with demodulation reference signal (DMRS) may be mapped to the symbols. Here, a synchronization signal block may be termed as an SS/PBCH block (or SSB for short).

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed.

Since the BFR is not a process of declaring an error/failure of a link between a network and a UE, it can be assumed that a connection with a current serving cell is maintained even if a BFR process is performed. In the BFR process, measurements are made on different beams set by the network (the beams can be represented by a CSI-RS port or an synchronization signal block (SSB) index, etc.), and the best beam for the UE can be selected. The UE can perform the BFR process by performing a RACH process associated with the corresponding beam with respect to the beam having a good measurement result.

Hereinafter, a transmission configuration indicator (TCI) state will be described. The TCI state may be set for each CORESET of the control channel and may determine a parameter for determining the receive (Rx) beam of the UE based on the TCI state.

For each downlink bandwidth portion (DL BWP) of the serving cell, the UE may be configured with up to three CORESETs. Also, for each CORESET, the UE may be provided with the following information.

1) The CORESET index p (e.g., one of 0 to 11, the index of each CORESET in BWPs of one serving cell may be uniquely determined)

2) PDCCH DM-RS scrambling sequence initialization value

3) The interval in the time domain of the CORESET (which may be given in symbol units)

4) Resource block set

5) CCE-to-REG mapping parameters

6) An antenna port quasi-co-location indicating quasi co-location (QCL) information of the DM-RS antenna port for PDCCH reception in each CORESET (from the set of antenna port quasi co-location provided by the upper layer parameter called "TCI-state")

7) Presence or absence of a transmission configuration indication (TCI) field for the specific DCI format transmitted by the PDCCH in the CORESET.

Hereinafter, the QCL will be described. If the characteristics of the channel on which symbols are transmitted on one antenna port can be inferred from the characteristics of the channel on which the symbols on the other antenna port are transmitted, then the two antenna ports are said to be in a quasi co-location (QCL). For example, when two signals A and B are transmitted from the same transmit antenna array with the same/similar spatial filter applied, the two signals may experience the same/similar channel condition. Upon receipt of one of the two signals, the receiver will be able to detect other signals using the channel characteristics of the received signal.

In this sense, the fact that A and B are quasi co-located (QCL) means that A and B have undergone similar channel conditions, and therefore, the channel information estimated to detect A is also useful for detecting B. Here, the channel condition may be defined by, for example, a Doppler shift, a Doppler spread, an average latency, a latency spread, a spatial reception parameter, and the like.

The TCI-State parameter associates one or two downlink reference signals with the corresponding QCL type (QCL types A, B, C, D, see Table 4).

TABLE 4

| QCL Type | Description |
| --- | --- |
| QCL-TypeA | Doppler shift, Doppler spread, average latency, latency spread, |
| QCL-TypeB | Doppler shift, Doppler spread, |
| QCL-TypeC | Doppler shift, average latency, |
| QCL-TypeD | Spatial Rx parameter |

Each TCI-State may include a parameter to set the QCL relationship between one or two downlink reference signals and the DM-RS port of the PDSCH (or PDCCH) or CSI-RS port of the CSI-RS resource.

On the other hand, in each DL BWP set to the UE in one serving cell, the UE can receive up to 10 search space sets. For each search space set, the UE may be provided with at least one of the following information.

1) Search space set index s (0≤s≤40), 2) The association between the CORESET P and the search space set s, 3) PDCCH monitoring period and PDCCH monitoring offset (slot unit), 4) PDCCH monitoring pattern in slot (For example, in the slot for PDCCH monitoring, the first symbol of the CORESET is indicated), 5) The number of slots in which the search space set s exists, 6) Number of PDCCH candidates per CCE aggregation level, 7) Information indicating whether search space set s is CSS or USS, etc.

In NR, CORESET #0 can be set by PBCH (or UE dedicated signaling or PSCell setting or BWP setting for handover). A search space (SS) set #0 set by the PBCH may have a different monitoring offset (e.g., a slot offset, a symbol offset) for each SSB associated therewith. This may be necessary to minimize the search space occasion that the UE should monitor. It may also be necessary to provide a sweeping control/data area for control/data transmission according to each beam so that communication with the UE can be continuously performed in a situation where the best beam of the UE changes dynamically.

Figure 13:
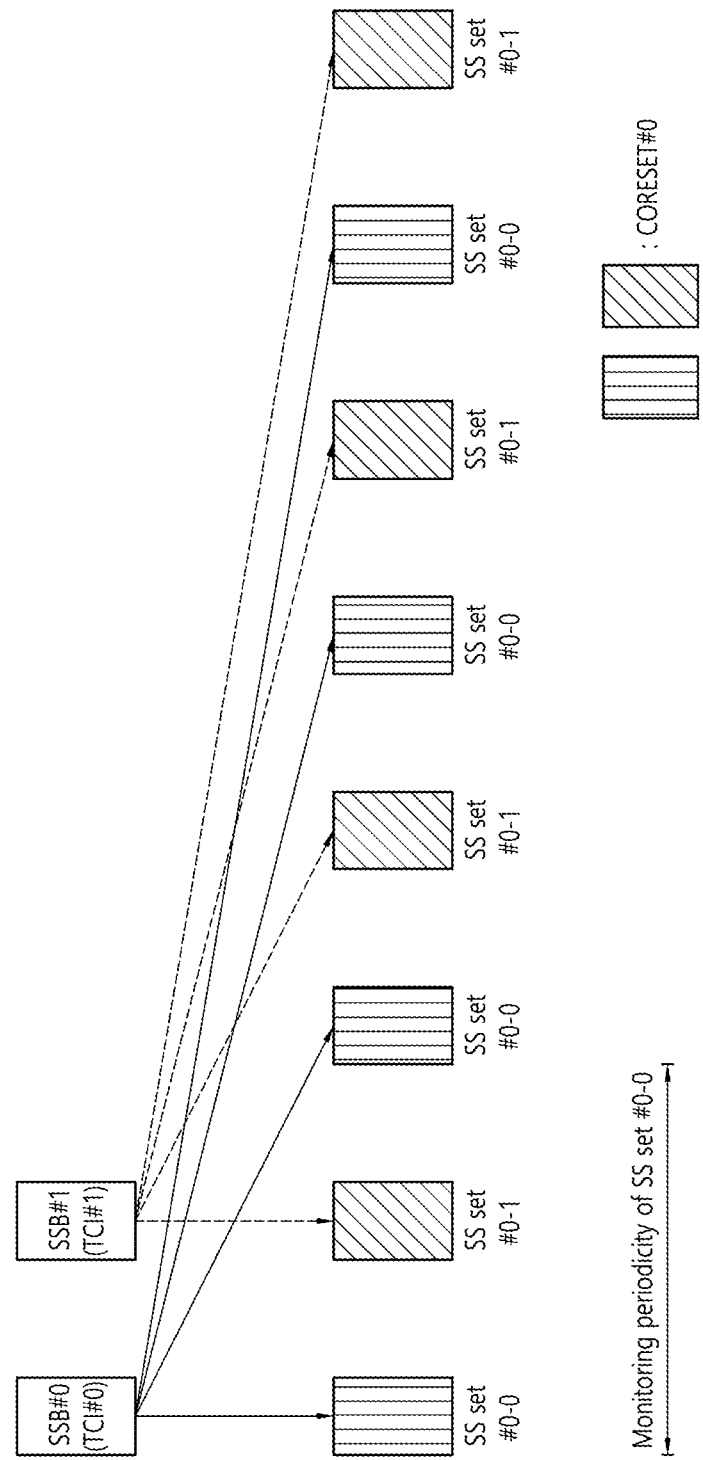
FIG. 13 illustrates an association between SSB and CORESET #0 and a search space set (SS set).

FIG. 13 illustrates an association between SSB and CORESET #0 and a search space set (SS set).

Referring to FIG. 13, the CORESET #0 may be a CORESET for monitoring the DCI that carries Remaining System Information (RMSI) scheduling information. Among the CORESET settings for the CORESET #0, the position and size in the frequency domain and the duration in the time domain may be set by a PBCH (e.g., a master information block (MIB) transmitted over a PBCH, and the rest of the CORESET configurations may be fixed, which may be the characteristic of the CORESET #0.

The CORESET #0 may be allocated a common search space (CSS(s)) for other system information (OSI), paging, and random access in addition to the RMSI, and may also be used for transmitting the UE-specific search space (USS) or the UE-dedicated PDCCH. When the search space set for OSI, paging, and random access is separately set, the search space may use another search space index.

As another feature of CORESET #0, there may not be an explicit setting for the transmission configuration indication (TCI) state. As described above, the TCI state may mean information necessary for the UE to set up the receive beam in NR. The TCI state at CORESET #0 may be determined by the SSB associated with the corresponding CORESET/search space set. There may exist a CORESET #0 and a search space set #0 associated with each SSB. Each UE may perform measurement on each SSB and monitor the CORESET #0/search space set #0 associated with the corresponding SSB based on the PBCH information of the SSB having the best measurement result. In FIG. 13, the search space set #0-0, the search space set #0-1, or the like is used to distinguish the search space set #0 by different SSBs. In the search space set #0-X, X means the associated SSB index.

Also, in the NR, UE-dedicated PDSCH scheduling information can be transmitted in the area which is set for the common search space (CSS) to the CORESET #0. In this case, the UE should perform monitoring on the corresponding DCI. For example, the following operations are possible.

1) QCL assumption for broadcast/non-broadcast PDCCH.
i) The network and the UE maintain the same understanding for SSB/CORESET #0/SS #0 in the connected mode at least for the non-broadcast PDCCH. ii) For the broadcast PDCCH, whether to monitor the common search space based on which SSB in all of the connection mode, the inactive mode and the idle mode may be a problem of UE implementation. iii) The unicast PDSCH may be scheduled by the DCI associated with CORESET #0.

2) UE-only (unicast, non-broadcast) DCI monitoring in a common search space.

i) In the case of a common search space set to RMSI-PDCCH-Config, osi-searchSpace, paging-searchSpace and ra-searchSpace, the C-RNTI becomes available, and then the DCI-format 0_0/1_0 in which the C-RNTI is used at the non-DRX time point can be monitored.

ii) In the case of a common search space set to RMSI-PDCCH-Config, osi-searchSpace, paging-searchSpace and ra-searchSpace, the CS-RNTI becomes available, and then the DCI-format 0_0/1_0 in which the CS-RNTI is used at the non-DCX time point can be monitored.

That is, the search space setting for each target can be performed for the UE by PBCH (i.e., RMSI-PDCCH-Config), RMSI (i.e., osi-searchSpace, paging-searchSpace, and ra-searchSpace), etc. In the search space set and the CORESET, it is possible to monitor the DCI format 0_0/1_0 scrambled with the C-RNTI/CS-RNTI in addition to the target signal. In addition, monitoring of the broadcast PDCCH can be performed for a search space set selected by the UE (e.g., search space set #0-0 or search space set #0-1 in FIG. 13). On the other hand, in the case of the non-broadcast PDCCH, monitoring should be performed on a selected search space set based on the same understanding of the network and the UE. For example, the network expects the UE to perform monitoring in the search space set #1, but if the UE performs monitoring in the search space set #2, it indicates that misunderstanding has occurred between the network and the UE. This is because, if there is no same understanding on the non-broadcast (or unicast) PDCCH monitoring, the network may need to repeatedly transmit the corresponding PDCCH to all search space sets associated with each SSB, which is inefficient. Further, in order to simultaneously perform monitoring of the broadcast PDCCH and the non-broadcast PDCCH, the same understanding between the network and the UE may be required for both the broadcast/non-broadcast in a specific mode.

The present invention will now be described.

In the TCI configuration for the CORESET, the available TCI types for each search space can be considered independently. For example, a valid TCI state may be set differently depending on the search space index. For example, in the case of the CORESET #0 and the search space #0, the monitoring occasion of the search space #0 can be determined the SSB index signaled to the UE or selected by the RACH process such as (Contention Based RACH) CBRA/(Contention Free RACH) CFRA. That is, in the case of the CORESET #0 associated with the search space #0, it may be desirable to be in the TCI state in units of SSB may be desirable for the CSI-RS/TRS associated with the SSB to be set to be in the TCI state. The CSI-RS/TRS associated with the SSB may refer to the CSI-RS/TRS in which the Type D QCL relationship with the SSB is defined by the TCI state, etc.

On the other hand, in the search space excluding the search space #0, the TCI state can be set regardless of the TCI type. Therefore, when the TCI state for CORESET #0/search space #0 is set or updated, if the SSB index is not CSI-RS/TRS associated with the SSB or the SSB index, the corresponding TCI state can be regarded as invalid and the existing TCI state can be maintained or the default TCI can be applied.

In addition, the validity of the TCI type may be determined based on the type of the search space (CSS/USS). For example, when the type of the search space is CSS, only the CSI-RS/TRS associated with the SSB index or SSB can be regarded as a valid TCI state. If the TCI state is determined as an invalid TCI state, an action to maintain the existing TCI state or to update it to the default TCI state can be taken.

If the above applies to the default TCI, the above proposal may be applied to the valid TCI state of the candidate group. For example, the TCI state of the lowest index among the set of TCI states which are set for the PDSCH, etc. (which is a superset of the TCI state that is set in the CORESET) is used as the default TCI, when the index #0 is set to CSI-RS #2 and the index #1 is set to SSB #1, the TCI state for CORESET #0/search space #0 can be set to index #1 (SSB #1), and in the case of the TCI state of the CORESET #0/search space #X, all types of TCI states are possible, and thus index #0 (CSI-RS #2) can be set as the default TCI state.

The criteria for the validity of the TCI state may be considered as follows. (The options below can be implemented alone or in combination.)

Option 1) CORESET Index

A valid TCI state type per CORESET may be predefined or may be determined by an indication via higher layer signaling of the network or the like. For example, through the predefined definition, it can be assumed that only the CSI-RS/TRS associated with the SSB type or the SSB is valid for the CORESET index #0, and all the types of TCI states are valid for the remaining CORESETs.

Figure 14:
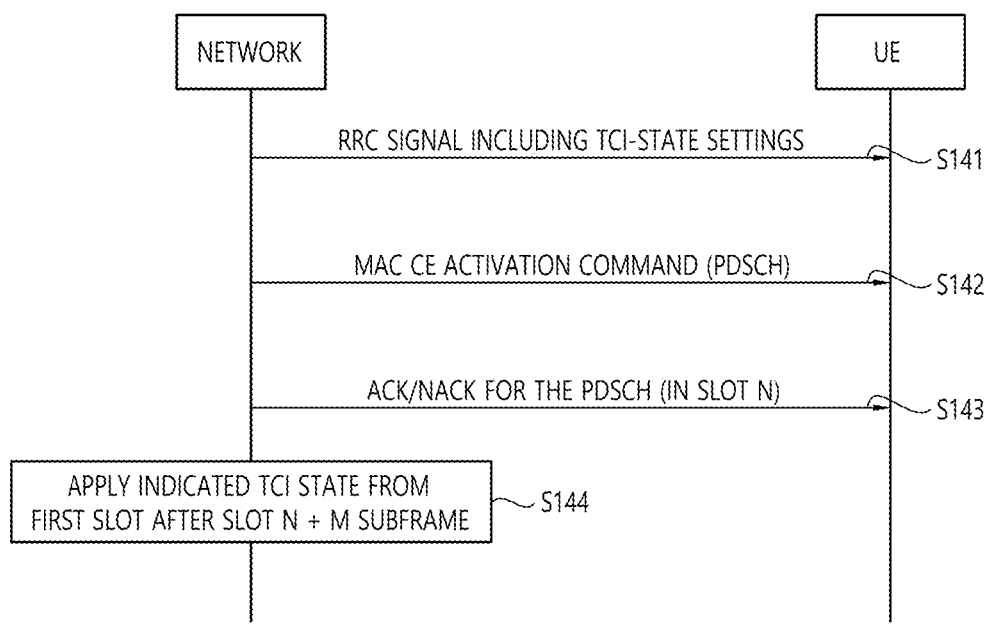
FIG. 14 shows an example of setting/applying the TCI state.

FIG. 14 shows an example of setting/applying the TCI state.

Referring to FIG. 14, the UE receives an RRC signal including TCI-state settings (S141). The following table is an example of an RRC signal that includes TCI-state settings.

TABLE 5

```
-- ASN1START
-- TAG-PDSCH-CONFIG-START
PDSCH-Config ::=                       SEQUENCE {
    dataScramblingIdentityPDSCH        INTEGER (0..1023)                              OPTIONAL,    -- Need S
    dmrs-DownlinkForPDSCH-MappingTypeA SetupRelease { DMRS-DownlinkConfig }           OPTIONAL,    -- Need
        M
    dmrs-DownlinkForPDSCH-MappingTypeB SetupRelease { DMRS-DownlinkConfig }           OPTIONAL,    -- Need
        M
    tci-StatesToAddModList     SEQUENCE (SIZE(1..maxNrofTCI-States)) OF TCI-State     OPTIONAL,    -- Need N
    tci-StatesToReleaseList    SEQUENCE (SIZE(1..maxNrofTCI-States)) OF TCI-StateId   OPTIONAL,    -- Need N
    vrb-ToPRB-Interleaver      ENUMERATED {n2, n4}                                    OPTIONAL,    -- Need S
    resourceAllocation         ENUMERATED { resourceAllocationType0, resourceAllocationType1, dynamicSwitch},
    pdsch-TimeDomainAllocationList  SetupRelease { PDSCH-TimeDomainResourceAllocationList }  OPTIONAL,    -- Need M
    pdsch-AggregationFactor    ENUMERATED { n2, n4, n8 }                              OPTIONAL,    -- Need S
    rateMatchPatternToAddModList       SEQUENCE (SIZE (1..maxNrofRateMatchPatterns)) OF RateMatchPattern
        OPTIONAL,     -- Need N
    rateMatchPatternToReleaseList      SEQUENCE (SIZE (1..maxNrofRateMatchPatterns)) OF RateMatchPatternId
        OPTIONAL,     -- Need N
    rateMatchPatternGroup1             RateMatchPatternGroup
        OPTIONAL,     -- Need R
    rateMatchPatternGroup2             RateMatchPatternGroup
        OPTIONAL,     -- Need R
    rbg-Size                   ENUMERATED {config1, config2},
    mcs-Table                  ENUMERATED {qam256, qam64LowSE}                        OPTIONAL,    --
        Need S
    maxNrofCodeWordsScheduledByDCI     ENUMERATED {n1, n2}                            OPTIONAL,
        -- Need R
    prb-BundlingType                   CHOICE {
        staticBundling                 SEQUENCE {
            bundleSize                 ENUMERATED { n4, wideband }                    OPTIONAL -- Need S
        },
```

TABLE 5-continued

```
        dynamicBundling                    SEQUENCE {
            bundleSizeSet1      ENUMERATED { n4, wideband, n2-wideband, n4-wideband }    OPTIONAL, -- Need S
            bundleSizeSet2      ENUMERATED { n4, wideband }                              OPTIONAL -- Need
                S       }
    },
    zp-CSI-RS-ResourceToAddModList        SEQUENCE (SIZE (1..maxNrofZP-CSI-RS-Resources)) OF ZP-CSI-RS-Resource
        OPTIONAL,      -- Need N
    zp-CSI-RS-ResourceToReleaseList       SEQUENCE (SIZE (1..maxNrofZP-CSI-RS-Resources)) OF ZP-CSI-RS-ResourceId
        OPTIONAL,      -- Need N
    aperiodic-ZP-CSI-RS-ResourceSetsToAddModList    SEQUENCE (SIZE (1..maxNrofZP-CSI-RS-ResourceSets)) OF ZP-CSI-RS-
            ResourceSet
        OPTIONAL,      -- Need N
    aperiodic-ZP-CSI-RS-ResourceSetsToReleaseList  SEQUENCE (SIZE (1..maxNrofZP-CSI-RS-ResourceSets)) OF ZP-CSI-RS-
            ResourceSetId
        OPTIONAL,      -- Need N
    sp-ZP-CSI-RS-ResourceSetsToAddModList    SEQUENCE (SIZE (1..maxNrofZP-CSI-RS-ResourceSets)) OF ZP-CSI-RS-
            ResourceSet
        OPTIONAL,      -- Need N
    sp-ZP-CSI-RS-ResourceSetsToReleaseList   SEQUENCE (SIZE (1..maxNrofZP-CSI-RS-ResourceSets)) OF ZP-CSI-RS-
            ResourceSetId
        OPTIONAL,      -- Need N
    p-ZP-CSI-RS-ResourceSet                  SetupRelease { ZP-CSI-RS-ResourceSet }
        OPTIONAL,      -- Need M
    ...
}
RateMatchPatternGroup ::=                    SEQUENCE (SIZE (1..maxNrofRateMatchPatternsPerGroup)) OF CHOICE {
    cellLevel                                    RateMatchPatternId,
    bwpLevel                                     RateMatchPatternId
}
-- TAG-PDSCH-CONFIG-STOP
-- ASN1STOP
```

In the above table, 'tci-StatesToAddModList' is a list of TCI states, and each TCI state may indicate a transmission setting including a QCL relationship between the downlink reference signal(s) and the PDSCH DMRS port(s) in the reference signal set.

The UE can receive a MAC CE activation command through the PDSCH (S142). The MAC CE activation command may indicate a TCI state of any one of the plurality of TCI states. The MAC CE activation command may include a field indicating a serving cell ID to which a MAC CE is applied (Serving cell ID), a field indicating the CORESET for which the TCI field state is designated (CORESET ID), a field indicating a TCI state applicable to the CORESET identified by the CORESET ID field (TCI state ID, for example, 7 bits), etc. At this time, with respect to the CORESET index #0 (CORESET #0), only the TCI state for setting/instructing the CSI-RS/TRS associated with the SSB can be limited to be valid. The CSI-RS/TRS associated with the SSB may refer to the CSI-RS/TRS in which the type D QCL relationship with the SSB is defined by the TCI state.

The UE may transmit an ACK/NACK for the MAC CE activation command in the slot n (S143). In this case, the one TCI state may be applied from the first slot after the slot n+M (M value may be preset (e.g., M=3) or indicated by the network) subframe (S144).

Figure 15:
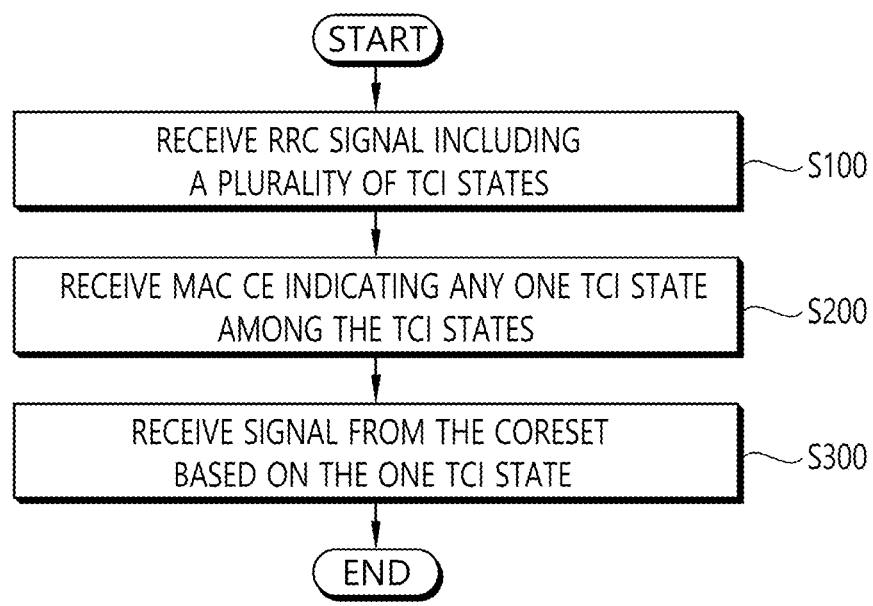
FIG. 15 illustrates a signal receiving method in a CORESET according to an embodiment of the present invention.

FIG. 15 illustrates a signal receiving method in a CORESET according to an embodiment of the present invention.

Referring to FIG. 15, a UE receives a radio resource control (RRC) signal including a plurality of TCI states (S100).

The UE receives a Medium Access Control (MAC) Control Element (CE) indicating a TCI state of any one of the plurality of TCI states (S200).

The UE receives a signal in the CORESET based on the one TCI state (S300). For example, the UE receives PDCCH (or control information, a control signal) in the CORESET based on the one TCI state. At this time, if the CORESET is the CORESET #0, the one TCI state may be related to the reference signal associated with the synchronization signal/physical broadcast channel block (SSB, SS/PBCH). That is, with respect to the CORESET #0, only the TCI state for setting/instructing the CSI-RS/TRS associated with the SSB can be understood to be valid. The CSI-RS/TRS associated with the SSB may refer to the CSI-RS/TRS in which the type D QCL relationship with the SSB is defined by the TCI state. For example, in the case of a CORESET having an index 0 (i.e., CORESET #0), the UE can expect that the QCL-Type D of the CSI-RS in the TCI state indicated by the MAC CE activation command for the CORESET #0 is provided based on the SS/PBCH block (SSB).

The quasi-co-location (QCL) information of the reference signal may be determined based on the SSB.

The reference signal may be a channel state information reference signal (CSI-RS).

The one TCI state may include information on a quasi-co-location (QCL) relationship between the CSI-RS and a demodulation reference signal (DMRS) port for the PDCCH/PDSCH.

The CORESET #0 may be established by information (e.g., MIB) transmitted over a physical broadcast channel (PBCH) or by dedicated RRC signaling. The MIB on the PBCH provides parameters (e.g., CORESET #0 settings) for monitoring the PDCCH that schedule the PDSCH carrying the system information block 1 (SIB 1) to the UE.

SIB1 may define a schedule of other system information blocks and may include information necessary for initial access. SIB1 is also referred to as RMSI (Remaining Minimum SI) and may be broadcast periodically via the DL-SCH or transmitted to the UE in the RRC_CONNECTED state in a dedicated manner via the DL-SCH.

For example, with respect to a CORESET with index 0 (i.e., CORESET #0), it may be assumed that a demodulation reference signal (DM-RS) antenna port (also referred to simply as a port) for PDCCH reception in the CORESET #0 1) is quasi co-located with one or more downlink reference signals (e.g., TRS, CSI-RS) which are set by the TCI state indicated by the MAC CE activation command for the CORESET, or 2) is quasi co-located with SS/PBCH block (SSB) identified by the UE during the most recent random access procedure which is not disclosed by the PDCCH command which triggers the non-contention based random access (if failing to receive the MAC CE activation command indicating the TCI state for the CORESET after the most recent random access procedure).

On the other hand, in the case of a CORESET other than the CORESET having the index 0 (for example, CORESET #1), if the UE is provided with one TCI state for the CORESET, or if the UE receives a MAC CE activation command for one of the TCI states provided for the CORESET, the UE can assume that the DM-RS antenna port associated with PDCCH reception in the CORESET is quasi co-located with one or more downlink reference signals set by the one TCI state.

In the case of a CORESET having an index 0 (i.e., CORESET #0), the UE can expect that the QCL-Type D of the CSI-RS in the TCI state indicated by the MAC CE activation command for the CORESET #0 is provided by the SS/PBCH block (SSB). In other words, the TCI state indicated by the MAC CE activation command for CORESET #0 is limited to what is related to the reference signal associated with the synchronization signal/physical broadcast channel block (SSB, SS/PBCH) or can be interpreted as valid only when indicating/setting the reference signal associated with the synchronization signal/physical broadcast channel block (SSB, SS/PBCH).

When the UE receives the MAC CE activation command for one TCI state of the TCI states, the MAC CE activation command can be applied from the first slot after 3 subframes after the slot (e.g., slot k) in which the ACK/NACK for the MAC CE activation command is transmitted.

Option 2) Search Space Index

The search space index can determine the validity of the TCI state. This can be determined by predefinition or by indication via higher layer signaling in the network. For example, through the predefined definition, it can be assumed that only the CSI-RS/TRS associated with the SSB type or the SSB is valid for the search space index #0, and all the types of TCI states are valid for the remaining search spaces.

Option 3) Whether Beam Sweeping is Performed

Whether beam sweeping for the CORESET and/or the search space is performed can determine the validity of the TCI state. This can be determined by predefinition or by indication via higher layer signaling in the network. For example, it can be assumed that in the case of a CORESET in which beam sweeping is performed, only CSI-RS/TRS associated with SSB type or SSB is valid, and in the case of a CORESET in which beam sweeping is not performed, all TCI states are valid.

Option 4) Network Setting

The network may indicate a valid TCI state type per CORESET and/or search space. For example, for a particular CORESET, the TCI state of the CORESET may be set to be valid only for CSI-RS/TRS associated with the SSB type or SSB.

Method 2) Default TCI state (added)

Option 3) Default TCI State Index

Another option to define the default TCI state may be to determine a specific (index) TCI state among TCI state sets signaled for PDSCH, as the default TCI state. At this time, the specific TCI state can be determined by the advance definition (e.g., TCI state of the lowest index) or by network configuration such as higher layer signaling. This can be implemented without additional RRC signaling. If the default TCI state is to be changed, the network can change the default TCI of the corresponding UE using the RRC resetting for the existing TCI state, which is an advantage.

At this time, if the TCI state set for the PDSCH or the like is not signaled, the default TCI state may be determined using the method 1 and/or 3, and if the TCI state set is signaled, a method of updating the default value, etc. may be applied.

<Handling CORESET #0>

The CORESET #0 may have a plurality of connected search spaces. The TCI state of the CORESET #0 can be updated based on the MAC CE in the set of set TCI states. When the TCI state of the CORESET #0 is set, the TCI information and the monitoring opportunity for the search in the search space #0 may follow the following options.

(1) The monitoring opportunity of search space #0 can always be based on the SSB index used in the most recent RACH procedure. If CFRA is triggered in the most recent RACH procedure, the SSB associated with the CSI-RS is assumed for the SSB index. If the CSI-RS is not associated with SSB, then the previous monitoring opportunity/association is used. That is, the previously selected SSB index may be used or it may be understood that an error has occurred. The TCI state of the CORESET #0 including the search space #0 can be updated according to the MAC CE if the MAC CE indicates the TCI state. Otherwise, it may follow the QCL of the SSB index used in the most recent RACH procedure.

(2) The monitoring opportunity of search space #0 may be based on SSB index on the most recent RACH or TCI state updated by MAC CE. If it is a CSI state by MAC CE, the associated SSB index can be used. If there is no associated SSB, then the most recent RACH procedure may be used or this situation may be considered as an error. The TCI state can be updated by only the MAC CE.

(3) The monitoring opportunity of search space #0 may be based on the most recent RACH process or the TCI state updated by the MAC CE. For TCI state by MAC CE, the associated SSB index is used. If there is no associated SSB, then the most recent RACH procedure may be used or this situation may be considered as an error. The TCI state may be updated based on the MAC CE or the most recent RACH procedure. In the case of SSB-based RACH processes, the TCI state is assumed based on SSB.

In summary, determining the monitoring opportunity of SS #0 when the TCI is set in the CORESET #0 may follow only the SSB-based RACH procedure (including the CSI-RS associated with the SSB-based RACH procedure) or may follow the most recent RACH procedure or the most recent SSB index derived from MAC CE update.

From the viewpoint of determining the TCI state, i) it always follows only the MAC CE (if the MAC CE is available) or ii) it follows the most recent event of RACH and MAC CE (in the case of the RACH, it is the QCL relationship, but the QCL information may be updated based on the RACH procedure for which the TCI state is not defined).

Figure 16:
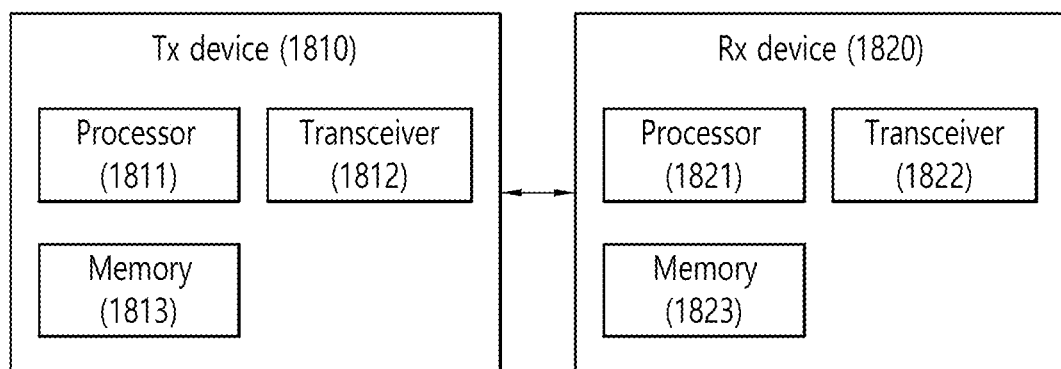
FIG. 16 is a block diagram showing components of a transmitting device and a receiving device for implementing the present invention.

FIG. 16 is a block diagram showing components of a transmitting device 1810 and a receiving device 1820 for implementing the present invention. Here, the transmitting device and the receiving device may be a base station and a terminal.

The transmitting device 1810 and the receiving device 1820 may respectively include transceivers 1812 and 1822 capable of transmitting or receiving radio frequency (RF) signals carrying information, data, signals and messages, memories 1813 and 1823 for storing various types of information regarding communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of embodiments of the present invention.

The memories 1813 and 1823 can store programs for processing and control of the processors 1811 and 1821 and temporarily store input/output information. The memories 1813 and 1823 may be used as buffers.

The processors 1811 and 1821 generally control overall operations of various modules in the transmitting device and the receiving device. Particularly, the processors 1811 and 1821 can execute various control functions for implementing the present invention. The processors 1811 and 1821 may be referred to as controllers, microcontrollers, microprocessors, microcomputers, etc. The processors 1811 and 1821 can be realized by hardware, firmware, software or a combination thereof. When the present invention is realized using hardware, the processors 1811 and 1821 may include ASICs (application specific integrated circuits), DSPs (digital signal processors), DSPDs (digital signal processing devices), PLDs (programmable logic devices), FPGAs (field programmable gate arrays) or the like configured to implement the present invention. When the present invention is realized using firmware or software, the firmware or software may be configured to include modules, procedures or functions for performing functions or operations of the present invention, and the firmware or software configured to implement the present invention may be included in the processors 1811 and 1821 or stored in the memories 1813 and 1823 and executed by the processors 1811 and 1821.

The processor 1811 of the transmitting device 1810 can perform predetermined coding and modulation on a signal and/or data to be transmitted to the outside and then transmit the signal and/or data to the transceiver 1812. For example, the processor 1811 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 1812 may include an oscillator for frequency up-conversion. The transceiver 1812 may include one or multiple transmission antennas.

The signal processing procedure of the receiving device 1820 may be reverse to the signal processing procedure of the transmitting device 1810. The transceiver 1822 of the receiving device 1820 can receive RF signals transmitted from the transmitting device 1810 under the control of the processor 1821. The transceiver 1822 may include one or multiple reception antennas. The transceiver 1822 can frequency-down-convert signals received through the reception antennas to restore baseband signals. The transceiver 1822 may include an oscillator for frequency down conversion. The processor 1821 can perform decoding and demodulation on RF signals received through the reception antennas to restore data that is intended to be transmitted by the transmitting device 1810.

The transceivers 1812 and 1822 may include one or multiple antennas. The antennas can transmit signals processed by the transceivers 1812 and 1822 to the outside or receive RF signals from the outside and deliver the RF signal to the transceivers 1812 and 1822 under the control of the processors 1811 and 1821 according to an embodiment of the present invention. The antennas may be referred to as antenna ports. Each antenna may correspond to one physical antenna or may be configured by a combination of a plurality of physical antenna elements. A signal transmitted from each antenna cannot be decomposed by the receiving device 1820. A reference signal (RS) transmitted corresponding to an antenna defines an antenna from the viewpoint of the receiving device 1820 and can allow the receiving device 1820 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 17:
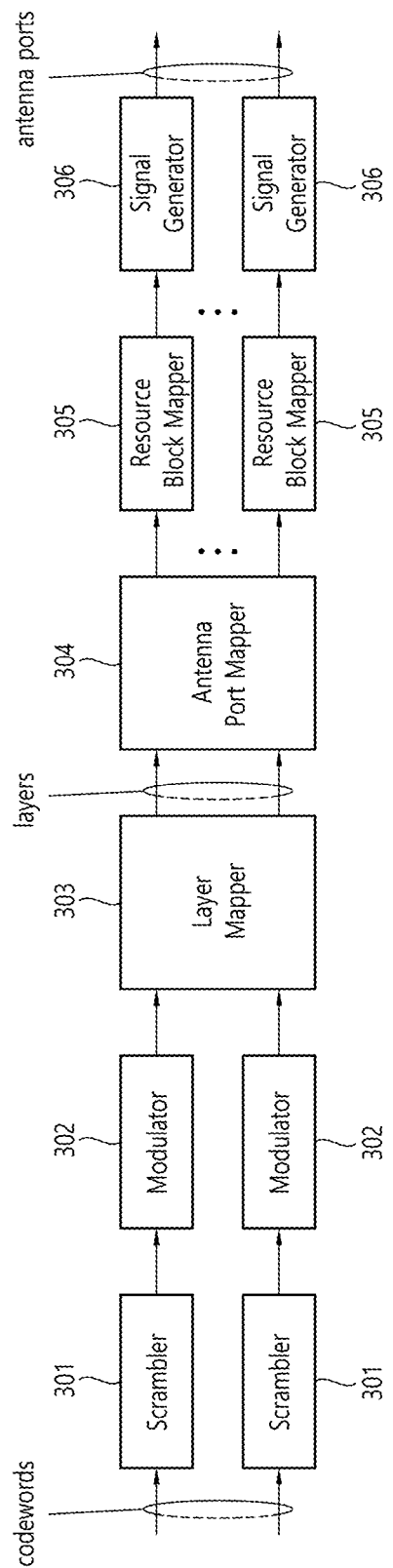
FIG. 17 illustrates an example of a signal processing module structure in the transmitting device.

FIG. 17 illustrates an example of a signal processing module structure in the transmitting device 1810. Here, signal processing can be performed by a processor of a base station/terminal, such as the processors 1811 and 1821 of FIG. 16.

Figure 18:
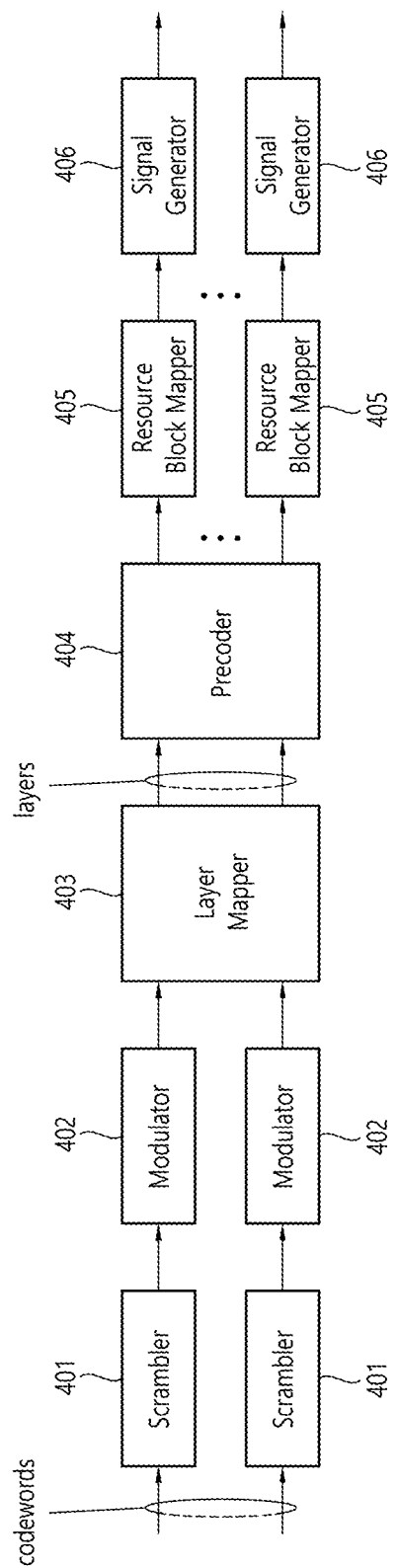
FIG. 18 illustrates another example of the signal processing module structure in the transmitting device.

Referring to FIG. 18, the transmitting device 1810 included in a terminal or a base station may include scramblers 301, modulators 302, a layer mapper 303, an antenna port mapper 304, resource block mappers 305 and signal generators 306.

The transmitting device 1810 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

FIG. 18 illustrates another example of the signal processing module structure in the transmitting device 1810. Here, signal processing can be performed by a processor of a terminal/base station, such as the processors 1811 and 1821 of FIG. 16.

Referring to FIG. 18, the transmitting device 1810 included in a terminal or a base station may include scramblers 401, modulators 402, a layer mapper 403, a precoder 404, resource block mappers 405 and signal generators 406.

The transmitting device 1810 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N*M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device 1820 may be reverse to the signal processing procedure of the transmitting device. Specifically, the processor 1821 of the transmitting device 1810 decodes and demodulates RF signals received through antenna ports of the transceiver 1822. The receiving device 1820 may include a plurality of reception antennas, and signals received through the reception antennas are restored to baseband signals, and then multiplexed and demodulated according to MIMO to be restored to a data string intended to be transmitted by the transmitting device 1810. The receiving device 1820 may include a signal restoration unit for restoring received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit for removing a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 19:
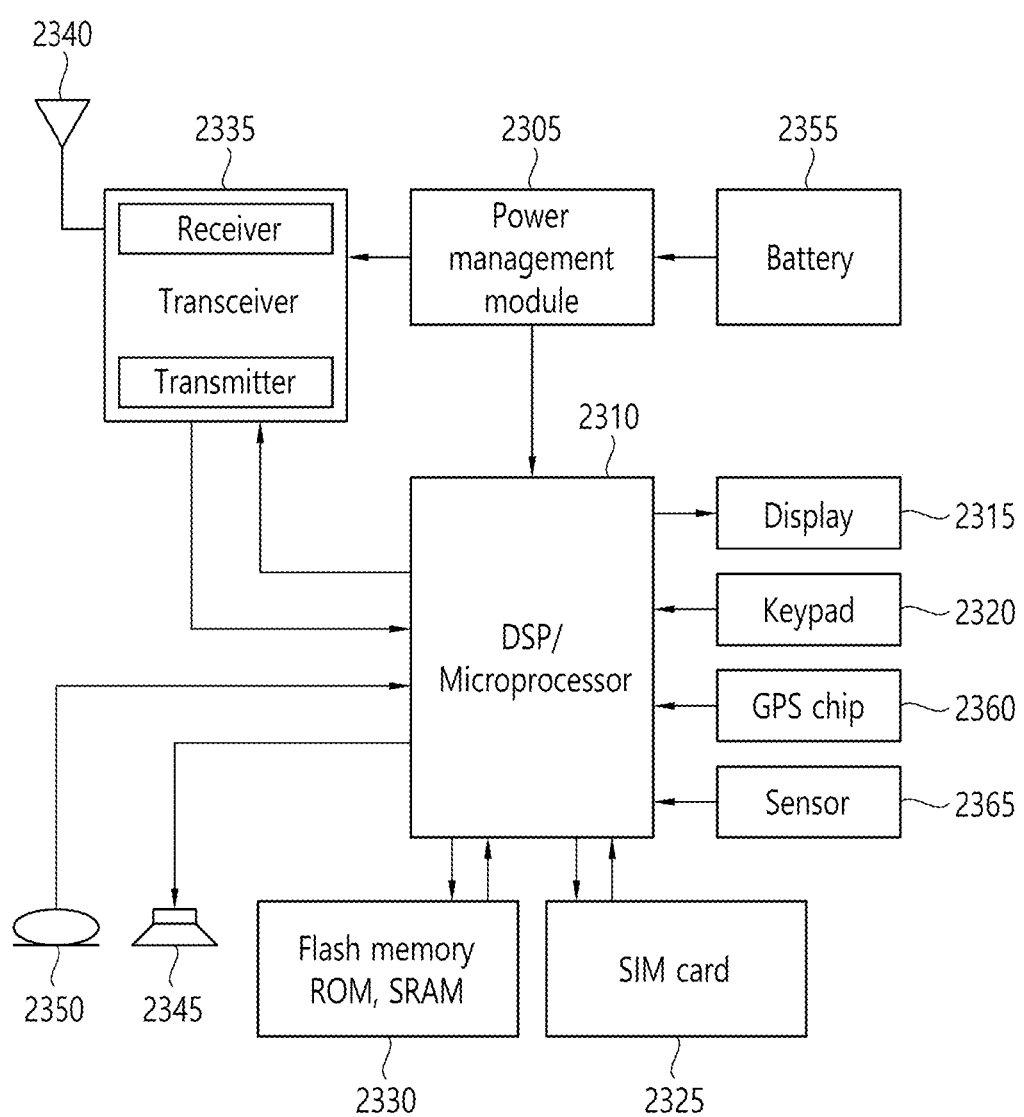
FIG. 19 illustrates an example of a wireless communication device according to an implementation example of the present invention.

FIG. 19 illustrates an example of a wireless communication device according to an implementation example of the present invention.

Referring to FIG. 19, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 19 may be the processors 1811 and 1821 in FIG. 16.

The memory 2330 is connected to the processor 2310 and stores information related to operations of the processor. The memory may be located inside or outside the processor and connected to the processor through various techniques such as wired connection and wireless connection. The memory 2330 in FIG. 19 may be the memories 1813 and 1823 in FIG. 16.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 19 may be the transceivers 1812 and 1822 in FIG. 16.

Although not shown in FIG. 19, various components such as a camera and a universal serial bus (USB) port may be additionally included in the terminal. For example, the camera may be connected to the processor 2310.

FIG. 19 is an example of implementation with respect to the terminal and implementation examples of the present invention are not limited thereto. The terminal need not essentially include all the components shown in FIG. 19. That is, some of the components, for example, the keypad 2320, the GPS chip 2360, the sensor 2365 and the SIM card 2325 may not be essential components. In this case, they may not be included in the terminal.

Figure 20:
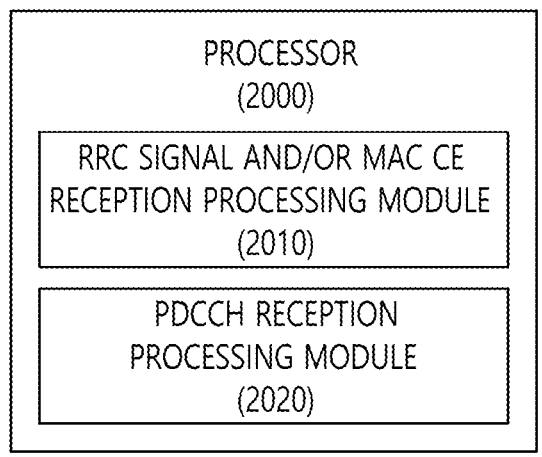
FIG. 20 shows an example of the processor.

FIG. 20 shows an example of a processor 2000.

Referring to FIG. 20, the processor 2000 may include an RRC signal and/or a MAC CE receive processing module 2010 and a PDCCH receive processing module 2020. The processor 2000 may execute the methods described in FIGS. 14 and 15 (receiver's position). For example, the processor 2000 may receive an RRC signal including a plurality of TCI states, receive a MAC CE indicating a TCI state of any of the plurality of TCI states, and receive signals in the CORESET based on the one TCI state. The processor 2000 may be one example of processors 1811 and 1821 of FIG. 16.

Figure 21:
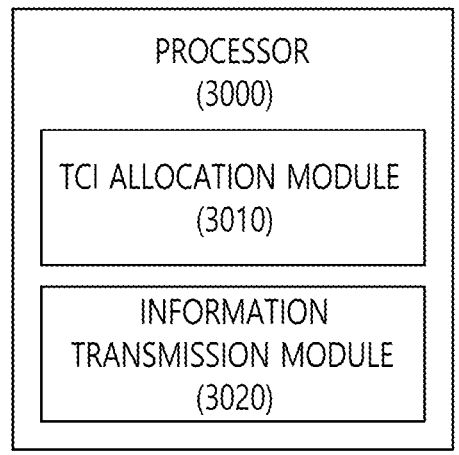
FIG. 21 shows an example of the processor.

FIG. 21 shows an example of a processor 3000.

Referring to FIG. 21, the processor 3000 may include a TCI allocation module 3010 and an information transmission module 3020. The processor 3000 may execute the methods described in the perspective of the transmitter in FIGS. 14-15. For example, the processor 3000 may determine and allocate TCI states for each CORESET. The RRC signal or the combination of the RRC signal and the MAC CE can be used to indicate the TCI state for the CORESET, and accordingly, the PDCCH can be transmitted (specifically, control information can be transmitted) in the CORESET. The processor 3000 may be one example of processors 1811 and 1821 of FIG. 16.

Figure 22:
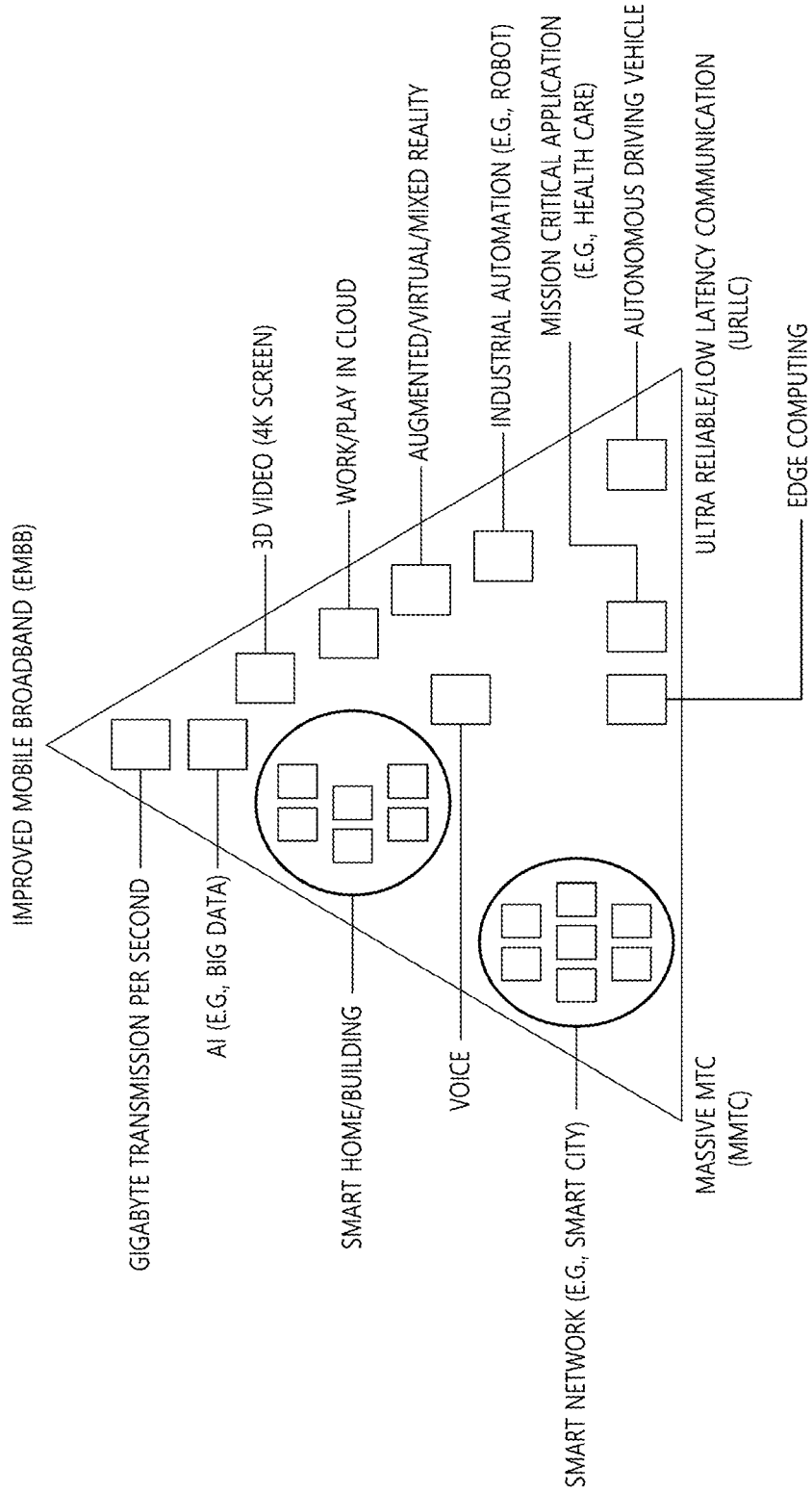
FIG. 22 shows an example of a 5G usage scenario to which the technical features of the present invention may be applied.

FIG. 22 shows an example of a 5G usage scenario to which the technical features of the present invention may be applied.

The 5G usage scenario shown in FIG. 22 is exemplary only, and the technical features of the present invention are applicable to other 5G usage scenarios not shown in FIG. 22.

Referring to FIG. 22, the three major requirements areas of 5G include (1) an enhanced mobile broadband (eMBB) domain, (2) a massive machine type communication (mMTC) domain, and 3) and (3) a ultra-reliable and low latency communications (URLLC) domain. Some use examples may require multiple areas for optimization and other use examples may only focus on only one key performance indicator (KPI). 5G is to support these various use examples in a flexible and reliable way.

eMBB focuses on the overall improvement of data rate, latency, user density, capacity and coverage of mobile broadband connections. The eMBB aims at a throughput of about 10 Gbps. The eMBB far surpasses basic mobile Internet access and covers media and entertainment applications in rich interactive work, cloud or augmented reality. Data is one of the key drivers of 5G and may not be able to see dedicated voice services for the first time in the 5G era. In 5G, the voice is expected to be processed as an application simply using the data connection provided by the communication system. The main reason for the increased amount of traffic is an increase in the size of the content and an increase in the number of applications requiring high data rates. Streaming services (audio and video), interactive video and mobile Internet connections will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special example of driving up the growth of uplink data rates. 5G is also used for remote tasks on the cloud and requires much lower end-to-end latency to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use example is augmented reality and information retrieval for entertainment. Here, augmented reality requires very low latency and instantaneous data amount.

The mMTC is designed to enable communication between a large amount of low-cost devices powered by batteries and is intended to support applications such as smart metering, logistics, field and body sensors. The mMTC is aimed at a 10 year battery and/or a million devices per square kilometer. The mMTC allows smooth connection of embedded sensors in all areas and is one of the most widely used 5G applications. Potentially by 2020, IoT devices are expected to reach 20.4 billion. Industry IoT is one of the areas where 5G plays a key role in enabling smart cities, asset tracking, smart utilities, agriculture and security infrastructures.

URLLC is ideal for automotive communications, industrial control, factory automation, remote surgery, smart grid and public safety applications by allowing devices and machines to communicate with high reliability, very low latency and high availability. The URLLC aims at a latency of about 1 ms. The URLLC includes new services that will change the industry through remote control of key infrastructures and ultra-trusted/low latency links such as autonomous driving vehicles. The level of reliability and latency is essential for smart grid control, industrial automation, robotics, drone control and coordination.

Next, a plurality of use examples included in the triangle of FIG. 22 will be described in more detail.

5G is a means to provide streams evaluated as hundreds of megabits per second and gigabits per second and may complement fiber-to-the-home (FTTH) and cable-based broadband (or DOCSIS). This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize latency.

Automotive is expected to become an important new driver for 5G, with many use examples for mobile communications to vehicles. For example, entertainment for passengers demands high capacity and high mobile broadband at the same time. This is because future users will continue to expect high-quality connections regardless of their location and speed. Another use example in the automotive sector is an augmented reality dashboard. The driver can identify an object in the dark on top of what is being viewed through the front window through the augmented reality dash board. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that the driver can drive more safely, thereby reducing the risk of accidents. The next step would be a remote control vehicle or an autonomous driving vehicle. This is very reliable and requires very fast communication between different autonomous driving vehicles and/or between cars and infrastructures. In the future, an autonomous driving vehicle will perform all driving activities, and the driver will focus only on unusual traffic situations that the vehicle itself cannot identify. The technical requirements of autonomous driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each assumption. Temperature sensors, windows and heating controllers, burglar alarms and appliances are all wirelessly connected. Many of these sensors typically require low data rates, low power and low cost. However, for example, real-time HD video may be required for certain types of devices for monitoring.

The consumption and distribution of energy, including heat or gas, is highly dispersed, thereby requiring automated control of distributed sensor networks. The smart grid interconnects these sensors using digital information and communication technologies to collect information and act according to the information. This information can include supplier and consumer behavior, allowing the smart grid to improve efficiency, reliability, economy, sustainability of production, and the distribution of fuel such as electricity by the automated scheme. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar latency, reliability, and capacity as cables and that their management is simplified. Low latency and very low error probabilities are new requirements that need to be connected to 5G.

Logistics and cargo tracking is an important use example for mobile communications enabling the tracking of inventory and packages anywhere using location based information systems. Use examples of logistics and cargo tracking typically require low data rates, but require large range and reliable location information.

Figure 23:
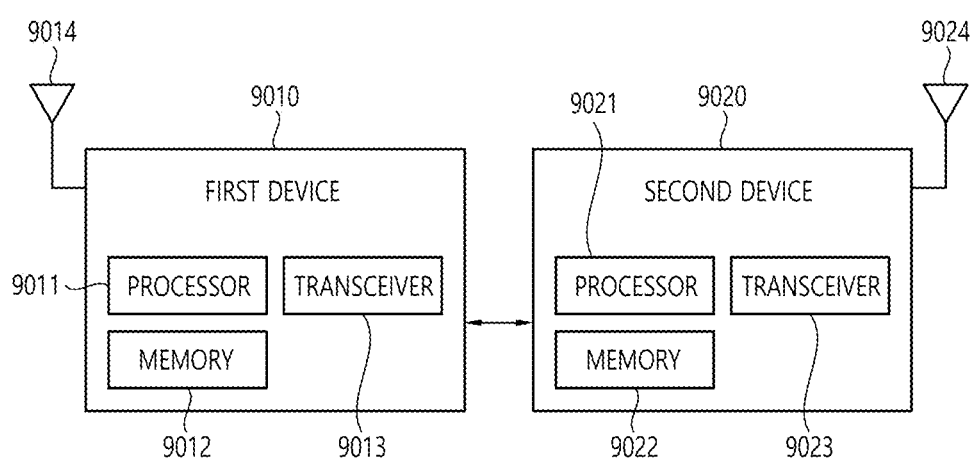
FIG. 23 shows a wireless communication apparatus according to an embodiment of the present invention.

FIG. 23 shows a wireless communication apparatus according to an embodiment of the present invention.

Referring to FIG. 23, a wireless communication system may include a first device 9010 and a second device 9020.

The first device 9010 may be a base station, a network node, a transmitting UE, a receiving UE, a wireless device, a wireless communication device, a vehicle, a vehicle equipped with an autonomous driving function, a connected car, a drone (unmanned aerial vehicle (UAV)), an artificial intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or a financial device), a security device, a climate/environment device, a device related to 5G services, or another device related to 4th Industrial Revolution.

The second device 9020 may be a base station, a network node, a transmitting UE, a receiving UE, a wireless device, a wireless communication device, a vehicle, a vehicle equipped with an autonomous driving function, a connected car, a drone (unmanned aerial vehicle (UAV)), an artificial intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or a financial device), a security device, a climate/environment device, a device related to 5G services, or another device related to 4th Industrial Revolution.

For example, the UE may be a mobile phone, a smart phone, a laptop computer, a digital broadcasting terminal, a personal digital assistant (PDA), a portable multimedia player (PMP), a navigation device, a slate PC, a tablet PC, an ultrabook, a wearable device (e.g., a smart watch, a smart glass, a head mounted display (HMD)), etc. For example, the HMD may be a display device worn on the head. For example, an HMD can be used to implement VR, AR, or MR.

For example, the drone can be a flying object that has no seat for people but that fly by radio control signals. For example, the VR device may include a device that implements an object or background in the virtual world. For example, the AR device may include an apparatus for connecting an object or a background of a virtual world to an object or a background of the real world. For example, the MR device may include a device that fuses an object or background of a virtual world with as an object or a background of the real-world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that can be worn by the user. For example, the MTC device and the IoT device may be devices that do not require direct human intervention or manipulation. For example, the MTC device and the IoT device may include a smart meter, a bending machine, a thermometer, a smart bulb, a door lock or various sensors. For example, the medical device may be a device used for diagnosing, treating, alleviating, treating, or preventing a disease. For example, the medical device may be a device used for the purpose of diagnosing, treating, alleviating, or correcting an injury or disorder. For example, a medical device may be a device used for the purpose of inspecting, replacing or modifying a structure or function. For example, the medical device may be a device used for the purpose of controlling pregnancy. For example, the medical device may include a medical device, a surgical device, an (in vitro) diagnostic device, a hearing aid or a surgical device, and the like. For example, a security device may be a device installed to prevent the risk that may occur and to maintain safety. For example, the security device may be a camera, a CCTV, a recorder, or a black box. For example, the FinTech device may be a device capable of providing financial services such as mobile payment. For example, the FinTech device may include a payment device or a point of sale (POS). For example, the climate/environmental device may include a device for monitoring or predicting the climate/environment.

The first device 9010 may include one or more processors including a processor 9011, at least one memory including a memory 9012, and at least one transceiver including a transceiver 9013. The processor 9011 may perform the functions, procedures, and/or methods described above. The processor 9011 may perform one or more protocols. For example, the processor 9011 may perform one or more layers of the wireless interface protocol. The memory 9012 is connected to the processor 9011 and may store various types of information and/or instructions. The transceiver 9013 is connected to the processor 9011 and can be controlled to transmit and receive wireless signals.

The second device 9020 may include at least one processor including a processor 9021, at least one memory device including a memory 9022, and at least one transceiver including a transceiver 9023. The processor 9011 may perform the functions, procedures, and/or methods described above. The processor 9021 may implement one or more protocols. For example, the processor 9021 may implement one or more layers of a wireless interface protocol. The memory 9022 is coupled to the processor 9021 and may store various types of information and/or instructions. The transceiver 9023 is connected to the processor 9021 and can be controlled to transmit and receive wireless signals.

The memory 9012 and/or the memory 9022 may be coupled internally or externally to the processor 9011 and/or the processor 9021, or may be connected to other processors through a variety of technologies such as wired or wireless connections.

The first device 9010 and/or the second device 9020 may have more than one antenna. For example, antenna 9014 and/or antenna 9024 may be configured to transmit and receive wireless signals.

The present invention may be applied to the following fields.

<Artificial Intelligence (AI)>

Artificial intelligence may refer to a field of studying methodology for making artificial intelligence. Machine learning may refer to a field of studying methodologies for defining and solving various problems which are dealt in artificial intelligence. Machine learning is defined as an algorithm that enhances the performance of a task through a steady experience.

An artificial neural network (ANN) is a model used in machine learning. It can mean a whole model having problem-solving ability, consisting of artificial neurons (nodes) that form a network of synapses. The artificial neural network can be defined by a connection pattern between neurons in different layers, a learning process for updating model parameters, and an activation function for generating an output value.

The artificial neural network may include an input layer, an output layer, and optionally one or more hidden layers. Each layer contains one or more neurons, and an artificial neural network may include a synapse that links neurons to neurons. In an artificial neural network, each neuron can output input signals that are input through the synapse, weight, and function value of the active function for bias.

Model parameters are parameters determined through learning, including weighting of synaptic connections and deflection of neurons. The hyper parameter means a parameter to be set in the machine learning algorithm before learning, and includes a learning rate, a repetition number, a mini batch size, an initialization function, and the like.

The objective of the artificial neural network learning can be seen as determining the model parameters that minimize the loss function. The loss function can be used as an index to determine optimal model parameters in the learning process of artificial neural networks.

Machine learning can be divided into Supervised Learning, Unsupervised Learning, and Reinforcement Learning depending on the learning method.

Guide learning is a method of learning artificial neural networks with labels about learning data given. Labels may mean the answers (or result values) that artificial neural networks should infer when learning data is input to artificial neural networks. Non-guide learning can mean a method of learning an artificial neural network without labels about learning data given. Reinforcement learning can mean a learning method in which an agent defined in an environment learns to select a behavior or sequence of actions that maximizes cumulative compensation in each state.

Machine learning implemented as a Deep Neural Network (DNN) that includes multiple hidden layers among artificial neural networks is also called a deep learning, and the deep learning is a part of machine learning. In the following, the term "machine learning" includes deep learning.

<Robot>

A robot can mean a machine that automatically processes or operates a given task by its own abilities. In particular, a robot having a function of recognizing the environment and performing self-determination and operation can be referred to as an intelligent robot.

Robots can be classified into industrial, medical, household, or military robots, etc. depending on the purpose and field of use.

The robot includes a driving unit including an actuator or a motor to perform various physical operations such as moving a robot joint. In addition, the movable robot includes a wheel, a brake, a propeller, and the like in a driving unit, and can travel on the ground or fly in the air through the driving unit.

<Self-Driving (Autonomous Driving)>

The term "autonomous driving" refers to a technology of self-driving, and the term "autonomous driving vehicle" refers to a vehicle that travels without a user's operation or with a minimum operation of a user.

For example, autonomous driving includes technologies for maintaining a lane while driving, technologies for automatically controlling speed such as adaptive cruise control, technologies for automatically traveling along a predetermined route, and technologies for automatically setting a route when a destination is set.

The vehicle includes a vehicle having only an internal combustion engine, a hybrid vehicle having an internal combustion engine and an electric motor together, and an electric vehicle having only an electric motor, and may include not only an automobile but also a train, a motorcycle and the like.

At this time, the autonomous driving vehicle can be regarded as a robot having an autonomous driving function.

<eXtended Reality (XR)>

Extended realities collectively include Virtual Reality (VR), Augmented Reality (AR), and Mixed Reality (MR). VR technology provides real-world objects and backgrounds only as CG images, AR technology provides CG images which are virtually made on real object images, and MR technology mixes and combines virtual objects in the real world.

MR technology is similar to AR technology in that it shows real and virtual objects together. However, in the AR technology, the virtual object is used as a complement to the real object, but in the MR technology, the virtual object and the real object are used in an equal manner.

XR technology can be applied to head-mounted display (HMD), head-up display (HUD), mobile phone, tablet PC, laptop, desktop, TV, digital signage, etc., and a device to which the XR technology is applied may be referred to as an XR device.

Figure 24:
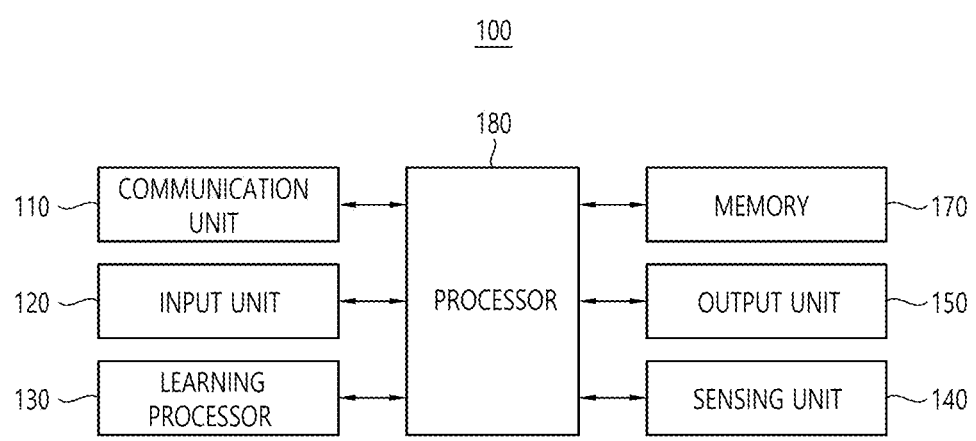
FIG. 24 shows an AI device 100 according to an embodiment of the present invention.

FIG. 24 shows an AI device 100 according to an embodiment of the present invention.

At least one method and/or apparatus of the above-described methods of the invention may be applied/included in the AI device. The AI device 100 may be implemented as a fixed device or a mobile device such as a TV, a projector, a mobile phone, a smart phone, a desktop computer, a notebook, a digital broadcasting terminal, a personal digital assistant (PDA), a portable multimedia player (PMP), a navigation device, a tablet PC, a wearable device, a set top box (STB), a DMB receiver, a radio, a washing machine, a refrigerator, a desktop computer, a digital signage, a robot, a vehicle, or the like.

Referring to FIG. 24, the UE 100 includes a communication unit 110, an input unit 120, a learning processor 130, a sensing unit 140, an output unit 150, a memory 170, and a processor 180.

The communication unit 110 can transmit and receive data to and from external devices such as the AI devices 100a to 100e and the AI server 200 by using wire/wireless communication technology. For example, the communication unit 110 can transmit and receive sensor information, a user input, a learning model, a control signal, and the like with external devices.

The communication technology used by the communication unit 110 includes a Global System for Mobile communication (GSM), a Code Division Multi Access (CDMA), a Long Term Evolution (LTE), a 5G, a Wireless LAN (WLAN), Bluetooth, Radio Frequency Identification (RFID), Infrared Data Association (IrDA), ZigBee, and Near Field Communication (NFC).

The input unit 120 can acquire various kinds of data.

At this time, the input unit 120 may include a camera for inputting a video signal, a microphone for receiving an audio signal, and a user input unit for receiving information from a user. Here, a camera or a microphone may be treated as a sensor, and a signal obtained from the camera or the microphone may be referred to as sensing data or sensor information.

The input unit 120 can acquire input data and the like to be used when acquiring an output using learning data and a learning model for model learning. The input unit 120 may obtain raw input data, in which case the processor 180 or the learning processor 130 may extract input features by pre-processing the input data.

The learning processor 130 may learn a model composed of an artificial neural network using learning data. Here, the learned artificial neural network can be referred to as a learning model. The learning model can be used to infer result values for new input data rather than learning data, and the inferred values can be used as a basis for determining which actions to perform.

At this time, the learning processor 130 may perform AI processing together with the learning processor 240 of the AI server 200.

At this time, the learning processor 130 may include memory integrated or implemented in the AI device 100. Alternatively, the learning processor 130 may be implemented using memory 170, an external memory directly coupled to the AI device 100, or a memory maintained in an external device.

The sensing unit 140 may acquire at least one of internal information of AI device 100, surrounding environment information of the AI device 100, and user information using various sensors.

The sensor included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lider, radar.

The output unit 150 may generate an output related to visual information, auditory information, tactile information, or the like.

At this time, the output unit 150 may include a display unit for outputting visual information, a speaker for outputting auditory information, and a haptic module for outputting tactile information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated using a data analysis algorithm or a machine learning algorithm. The processor 180 may then control the components of the AI device 100 to perform the determined operation.

To this end, the processor 180 may request, retrieve, receive, or utilize data in the learning processor 130 or the memory 170 and may control the components of the AI device 100 to execute the predicted operation or the operation determined to be desirable among the at least one executable operation.

At this time, the processor 180 may generate a control signal for controlling the external device and transmit the generated control signal to the external device if the external device needs to be linked to perform the determined operation.

The processor 180 may obtain the intention information for the user input and determine the user's requirements based on the obtained intention information.

At this time, the processor 180 may acquire intention information corresponding to a user input by using at least one of a Speech To Text (STT) engine for converting a speech input into a string or a Natural Language Processing (NLP) engine for acquiring intention information of a natural language.

At this time, at least one of the STT engine or the NLP engine may be configured as an artificial neural network, at least a part of which is learned according to a machine learning algorithm. At least one of the STT engine and the NLP engine may be one learned by the learning processor 130 or learned by the learning processor 240 of the AI server 200, or may have been learned by dispersion processing of these.

The processor 180 collects history information including the operation of the AI device 100 or the user's feedback on the operation and stores the collected history information in the memory 170 or the learning processor 130, or the information may be transmitted to an external device such as the AI server 200. The collected history information can be used to update the learning model.

The processor 180 may control at least some of the components of AI device 100 to drive an application program stored in memory 170. Further, the processor 180 may operate two or more of the components included in the AI device 100 in combination with each other in order to drive the application program.

Figure 25:
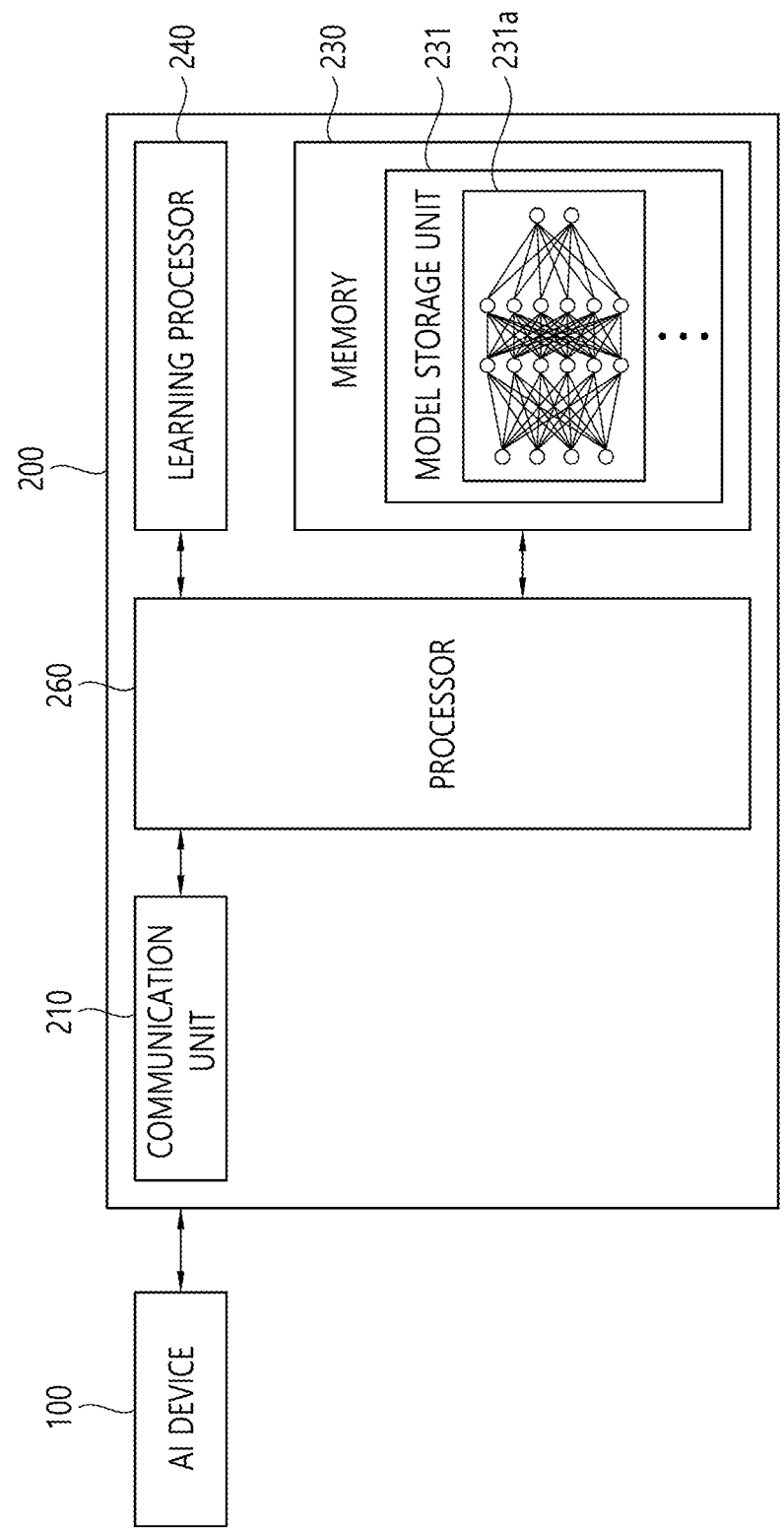
FIG. 25 shows an AI server 200 according to an embodiment of the present invention.

FIG. 25 shows an AI server 200 according to an embodiment of the present invention.

Referring to FIG. 25, the AI server 200 may refer to a device that learns an artificial neural network using a machine learning algorithm or uses a learned artificial neural network. Here, the AI server 200 may be composed of a plurality of servers to perform distributed processing, or may be defined as a 5G network. At this time, the AI server 200 may be included in a configuration of a part of the AI device 100, and may perform at least a part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a currently learning or already learned model (or an artificial neural network, 231*a*) through the learning processor 240.

The learning processor 240 can train the artificial neural network 231*a* using the learning data. The learning model may be used in a state where it is mounted on the AI server 200 of the artificial neural network, or may be used by being loaded on an external device such as the AI device 100 or the like.

The learning model may be implemented in hardware, software, or a combination of hardware and software. If some or all of the learning models are implemented in software, one or more instructions that constitute the learning model may be stored in the memory 230.

The processor 260 may infer the result value for new input data using the learning model and generate a response or control command based on the inferred result value.

Figure 26:
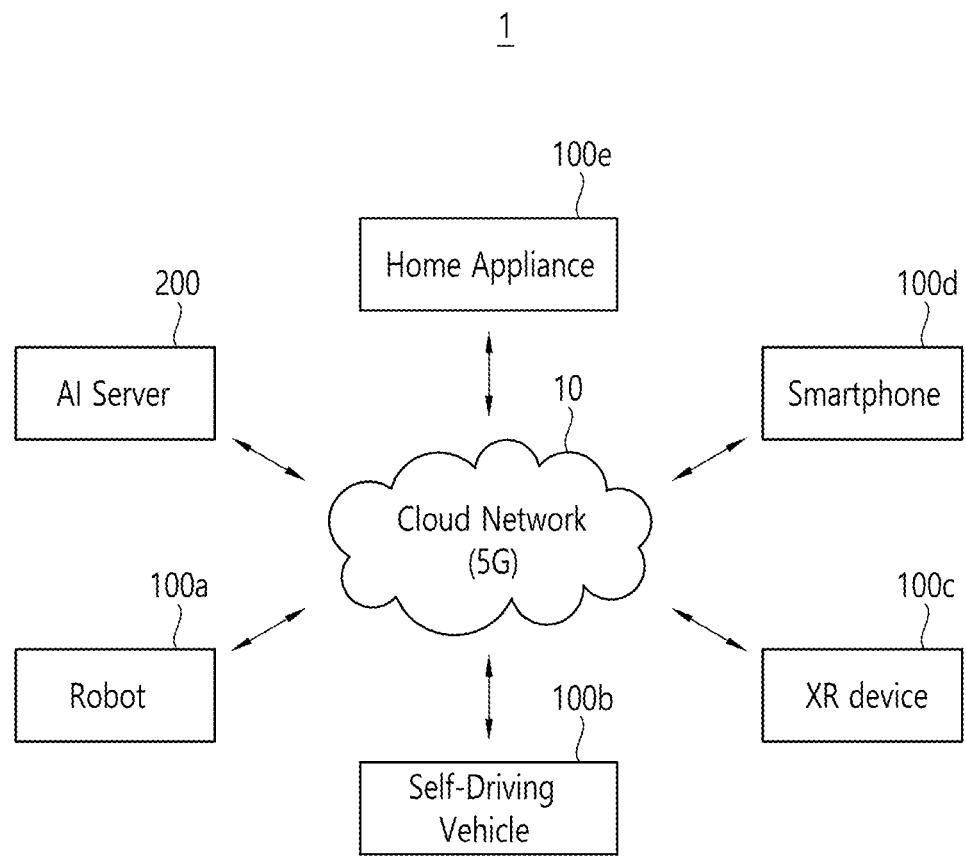
FIG. 26 shows an AI system 1 according to an embodiment of the present invention.

FIG. 26 shows an AI system 1 according to an embodiment of the present invention.

Referring to FIG. 26, in the AI system 1, at least one of the AI server 200, the robot 100*a*, the autonomous driving vehicle 100*b*, the XR apparatus 100*c*, the smartphone 100*d* or the household appliance 100*e* is connected to the cloud network 10. Here, the robot 100*a*, the autonomous driving vehicle 100*b*, the XR apparatus 100*c*, the smartphone 100*d*, or the household appliance 100*e* to which the AI technology is applied may be referred to as AI devices 100*a* to 100*e*.

The cloud network 10 may refer to a network that forms part of a cloud computing infrastructure or resides in a cloud computing infrastructure. Here, the cloud network 10 may be configured using a 3G network, a 4G or Long Term Evolution (LTE) network or a 5G network.

That is, each of the devices 100*a* to 100*e* and 200 constituting the AI system 1 may be connected to each other through the cloud network 10. In particular, each of the devices 100*a* to 100*e* and 200 may communicate with each other through a base station, but may directly communicate with each other without using a base station.

The AI server 200 may include a server for performing AI processing and a server for performing operations on big data.

The AI server 200 is connected to one or more of the AI devices constituting the AI system 1, that is, the robot 100*a*, the autonomous driving vehicle 100*b*, the XR apparatus 100*c*, the smartphone 100*d*, and the home appliance 100*e* and may assist at least some AI processing of the connected AI devices 100*a* through 100*e*.

At this time, the AI server 200 can train the artificial neural network according to the machine learning algorithm on behalf of the AI devices 100*a* to 100*e*, and can directly store the learning model or transmit the learning model to the AI devices 100*a* to 100*e*.

At this time, the AI server 200 receives the input data from the AI devices 100*a* through 100*e*, infer the result value with respect to the received input data using the learning model, and outputs a response or a control command based on the inferred result value and transmit the response or the control command to AI devices 100*a* through 100*e*.

Alternatively, the AI devices 100*a* through 100*e* may infer a result value for the input data using a direct learning model, and generate a response or a control command based on the result of the inference.

Hereinafter, various embodiments of AI devices 100*a* to 100*e* to which the above-described technology is applied will be described. Here, the AI devices 100*a* to 100*e* shown in FIG. 26 can be seen as specific embodiments of the AI device 100 shown in FIG. 24.

<AI+Robot>

The robot 100*a* may be implemented as a guide robot, a carrying robot, a cleaning robot, a wearable robot, an entertainment robot, a pet robot, an unmanned flying robot, or the like, to which AI technology is applied.

The robot 100*a* may include a robot control module for controlling the operation, and the robot control module may refer to a software module or a chip implementing it in hardware.

The robot 100*a* may acquire the state information of the robot 100*a* using the sensor information acquired from various kinds of sensors, detect (recognize) the surrounding environment and the object, generate map data, determine a travel route and a travel plan, determine a response to user interaction, or determine an operation.

Here, the robot 100*a* can use the sensor information acquired from at least one sensor among the lider, the radar, and the camera to determine the travel route and the travel plan.

The robot 100a can perform the above-described operations using a learning model composed of at least one artificial neural network. For example, the robot 100a can recognize the surrounding environment and the object using the learning model, and can determine the operation using the recognized surrounding environment information or the object information. Here, the learning model may be learned directly from the robot 100a or learned from an external device such as the AI server 200.

At this time, the robot 100a may generate the result using the direct learning model to perform the operation. However, the robot 100a may transmit the sensor information to the external device such as the AI server 200 and receive the generated result according thereto to thereby performing the operation.

The robot 100a may determine the travel route and the travel plan using at least one of the map data, the object information detected from the sensor information or the object information acquired from the external device, and control the driving unit to move the robot 100a according to the determined travel route and travel plan.

The map data may include object identification information on various objects arranged in a space in which the robot 100a moves. For example, the map data may include fixed objects such as walls and doors, and object identification information on movable objects such as a flowerpot and a desk. The object identification information may include a name, a type, a distance, and a position.

In addition, the robot 100a can perform the operation or run by controlling the driving unit based on the control/interaction of the user. At this time, the robot 100a may acquire the intention information of the interaction due to the user's operation or voice utterance, determine the response based on the acquired intention information, and perform the operation.

<AI+Autonomous Driving>

The autonomous driving vehicle 100b may be implemented as a mobile robot, a vehicle, an unmanned aerial vehicle, or the like, to which AI technology is applied.

The autonomous driving vehicle 100b may include an autonomous drive control module for controlling the autonomous driving function, and the autonomous drive control module may refer to a software module or a chip implementing the software module in hardware. The autonomous-drive control module may be included in the autonomous driving vehicle 100b as a component of the autonomous driving vehicle 100b, but may be connected to the outside of the autonomous driving vehicle 100b by a separate hardware.

The autonomous driving vehicle 100b can acquire the state information of the autonomous driving vehicle 100b using the sensor information acquired from various kinds of sensors, detect (recognize) the surrounding environment and objects, generate map data, determine a travel route and a travel plan, or determine an operation.

Here, the autonomous driving vehicle 100b can use the sensor information acquired by at least one of the sensors such as the lider, the radar, and the camera in the same manner as the robot 100a in order to determine the travel route and the travel plan.

In particular, the autonomous driving vehicle 100b can receive or recognize sensor information from external devices or receive information directly recognized from external devices with respect to an environment or an object for an area in which the field of view is obscured or an area located away by more than a certain distance.

The autonomous driving vehicle 100b may perform the above-described operations using a learning model composed of at least one artificial neural network. For example, the autonomous driving vehicle 100b can recognize the surrounding environment and the object by using the learning model, and can determine the travel route by using the recognized surrounding information or object information. Here, the learning model may be learned directly from the autonomous driving vehicle 100b or learned from an external device such as the AI server 200.

At this time, the autonomous driving vehicle 100b may generate the result using the direct learning model to perform the operation. However, the robot 100a may transmit the sensor information to the external device such as the AI server 200 and receive the generated result according thereto to thereby performing the operation.

The autonomous driving vehicle 100b may determine the travel route and the travel plan using at least one of the map data, the object information detected from the sensor information or the object information acquired from the external device, and control the driving unit to move the autonomous driving vehicle 100b according to the determined travel route and travel plan.

The map data may include object identification information on various objects disposed in a space (e.g., a road) where the autonomous driving vehicle 100b runs. For example, the map data may include fixed objects such as street lamps, rocks, and buildings, and object identification information on movable objects such as vehicles and pedestrians. The object identification information may include a name, a type, a distance, and a position.

In addition, the autonomous driving vehicle 100b can perform the operation or run by controlling the driving unit based on the control/interaction of the user. At this time, the autonomous driving vehicle 100b may acquire the intention information of the interaction due to the user's operation or voice utterance, determine the response based on the acquired intention information, and perform the operation.

<AI+XR>

The XR apparatus 100c can be implemented as a head-mount display (HMD), a head-up display (HUD), a television, a mobile phone, a smart phone, a computer, a wearable device, a home appliance, a digital signage, a vehicle, a fixed robot or a mobile robot, to which AI technology is applied.

The XR apparatus 100c may analyze the three-dimensional point cloud data or image data acquired from various sensors or an external device to generate position data and attribute data for the three-dimensional points, thereby obtaining information about the surrounding space or the real object, and rendering an XR object to be outputted and output the rendered XR object. For example, the XR apparatus 100c may allow an XR object including the additional information about the recognized object to corresponding to the recognized object, to thereby be outputted.

The XR apparatus 100c can perform the above-described operations using a learning model composed of at least one artificial neural network. For example, the XR apparatus 100c can recognize a real object from three-dimensional point cloud data or image data using a learning model, and can provide information corresponding to the recognized real object. Here, the learning model may be learned directly from the XR apparatus 100c or learned from an external device such as the AI server 200.

At this time, the XR apparatus 100c may generate the result using the direct learning model to perform the operation. However, the robot 100a may transmit the sensor information to the external device such as the AI server 200 and receive the generated result according thereto to thereby performing the operation.

<AI+Robot+Autonomous Driving>

The robot 100a may be implemented as a guide robot, a carrying robot, a cleaning robot, a wearable robot, an entertainment robot, a pet robot, an unmanned flying robot, or the like, to which AI technology and autonomous driving technology are applied.

The robot 100a to which the AI technology and the autonomous driving technology are applied may mean the robot itself having the autonomous driving function or the robot 100a interacting with the autonomous driving vehicle 100b.

The robot 100a having the autonomous driving function can collectively refer to devices that move by themselves according to a given route without user's control or determine the route by themselves and move according to the determined route.

The robot 100a having the autonomous driving function and the autonomous driving vehicle 100b can use a common sensing method to determine at least one of the travel route or the travel plan. For example, the robot 100a having the autonomous driving function and the autonomous driving vehicle 100b can determine at least one of the travel route or the travel plan using the information sensed through the lider, the radar, and the camera.

The robot 100a interacting with the autonomous driving vehicle 100b may be independent of the autonomous driving vehicle 100b and may be linked to the autonomous driving function inside or outside the autonomous driving vehicle 100b, or may perform an operation associated with the user who has boarded the vehicle.

At this time, the robot 100a interacting with the autonomous driving vehicle 100b may acquire sensor information on behalf of the autonomous driving vehicle 100b and provide the sensor information to the autonomous driving vehicle 100b, or may acquire sensor information and generate surrounding environment information or object information and provide the information to the autonomous driving vehicle 100b, thereby controlling or assisting the autonomous driving function of the autonomous driving vehicle 100b.

Alternatively, the robot 100a interacting with the autonomous driving vehicle 100b may monitor the user boarding the autonomous driving vehicle 100b or may control the functions of the autonomous driving vehicle 100b through interaction with the user. For example, when it is determined that the driver is in a drowsy state, the robot 100a may activate the autonomous driving function of the autonomous driving vehicle 100b or assist the control of the driving unit of the autonomous driving vehicle 100b. The function of the autonomous driving vehicle 100b controlled by the robot 100a may include not only an autonomous driving function but also functions provided by a navigation system or an audio system provided in the autonomous driving vehicle 100b.

Alternatively, the robot 100a interacting with the autonomous driving vehicle 100b may provide information to the autonomous driving vehicle 100b outside the autonomous driving vehicle 100b or assist the function. For example, the robot 100a may provide traffic information including signal information and the like to the autonomous driving vehicle 100b, such as a smart signal, or may interact with the autonomous driving vehicle 100b, such as an automatic electric charger of an electric vehicle to thereby connect the electric charger to a charging hole automatically.

<AI+Robot+XR>

The robot 100a may be implemented as a guide robot, a carrying robot, a cleaning robot, a wearable robot, an entertainment robot, a pet robot, an unmanned flying robot, a drone or the like, to which AI technology and XR technology are applied.

The robot 100a to which the XR technology is applied may refer to a robot that is subject to control/interaction in the XR image. In this case, the robot 100a is separated from the XR apparatus 100c and can be interlocked with each other.

When the robot 100a to be controlled/interacted within the XR image acquires the sensor information from the sensors including the camera, the robot 100a or the XR apparatus 100c can generate the XR image based on the sensor information and the XR apparatus 100c can output the generated XR image. The robot 100a can operate based on a control signal input through the XR apparatus 100c or a user's interaction.

For example, the user can confirm the XR image corresponding to the viewpoint of the robot 100a remotely interlocked through an external device such as the XR apparatus 100c, and adjust the autonomous travel route of the robot 100a through the interaction, control the operation or the movement, or check the information of the neighboring objects.

<AI+Autonomous Driving+XR>

The autonomous driving vehicle 100b may be implemented as a mobile robot, a vehicle, an unmanned aerial vehicle, or the like, to which AI technology and XR technology are applied.

The autonomous driving vehicle 100b to which the XR technology is applied may mean an autonomous driving vehicle having a means for providing an XR image or an autonomous driving vehicle to be controlled/interacted in an XR image. Particularly, the autonomous driving vehicle 100b to be controlled/interacted within the XR image can be separated from the XR apparatus 100c and interlocked with each other.

The autonomous driving vehicle 100b having the means for providing the XR image can acquire the sensor information from the sensors including the camera and output the XR image generated based on the acquired sensor information. For example, the autonomous driving vehicle 100b may include an HUD to output an XR image, thereby providing a passenger with an XR object corresponding to a real object or an object in the screen.

At this time, when the XR object is outputted to the HUD, at least a part of the XR object may be outputted so as to overlap with the real object that the passenger's gaze is directed to. On the other hand, when the XR object is output to the display provided in the autonomous driving vehicle 100b, at least a part of the XR object may be output so as to overlap with the object in the screen. For example, the autonomous driving vehicle 100b may output XR objects corresponding to objects such as a lane, another vehicle, a traffic light, a traffic sign, a two-wheeled vehicle, a pedestrian, a building, and the like.

When the autonomous driving vehicle 100b to be controlled/interacted within the XR image acquires the sensor information from the sensors including the camera, the autonomous driving vehicle 100b or the XR apparatus 100c can generate the XR image based on the sensor information and the XR apparatus 100c can output the generated XR image. The autonomous driving vehicle 100b may operate based on a control signal inputted through an external device such as the XR apparatus 100c, or an interaction of a user.

What is claimed is:

1. A method of receiving a signal in a control resource set (CORESET) of a wireless communication system, the method performed by a user equipment (UE) and comprising:
   receiving a radio resource control (RRC) signal including information regarding a plurality of transmission configuration indicator (TCI) states;
   receiving a medium access control (MAC) control element (CE) informing a TCI state among the plurality of TCI states; and
   receiving a signal in the CORESET based on the TCI state,
   wherein, based on the CORESET being CORESET #0, (i) a demodulation-reference signal (DM-RS) antenna port for a physical downlink control channel (PDCCH) reception in the CORESET #0 is quasi co-located with a channel state information reference signal (CSI-RS) informed by the TCI state, and (ii) quasi co-location-type D (QCL-type D) of the CSI-RS is provided by a synchronization signal/physical broadcast channel block (SSB).

2. The method of claim 1, wherein the QCL-type D of the CSI-RS is determined based on the SSB.

3. The method of claim 1, wherein the CORESET #0 is configured by information which is transmitted through a physical broadcast channel (PBCH).

4. A user equipment (UE) comprising:
   a transceiver configured to transmit and receive a wireless signal; and
   a processor configured to operate in combination with the transceiver,
   a computer-readable memory storing instructions that, based on being executed by the processor, control the UE to:
   receive a radio resource control (RRC) signal including information regarding a plurality of TCI states,
   receive a medium access control (MAC) control element (CE) informing a TCI state among the plurality of TCI states; and
   receive a signal in a control resource set (CORESET) based on the TCI state,
   wherein, based on the CORESET being CORESET #0, (i) a demodulation-reference signal (DM-RS) antenna port for a physical downlink control channel (PDCCH) reception in the CORESET #0 is quasi co-located with a channel state information reference signal (CSI-RS) informed by the TCI state, and (ii) quasi co-location-type D (QCL-type D) of the CSI-RS is provided by a synchronization signal/physical broadcast channel block (SSB).

5. The UE of claim 4, wherein the QCL-type D of the CSI-RS is determined based on the SSB.

6. The UE of claim 4, wherein the CORESET #0 is set by information which is transmitted through a physical broadcast channel (PBCH).

7. A processing device for a wireless communication device in a wireless communication system, the processing device comprising:
   a processor; and
   a computer-readable memory storing instructions that, based on being executed by the processor, control the wireless communication device to:
   receive a radio resource control (RRC) signal including information regarding a plurality of TCI states,
   receive a medium access control (MAC) control element (CE) informing a TCI state among the plurality of TCI states; and
   receive a signal in a control resource set (CORESET) based on the TCI state,
   wherein, based on the CORESET being CORESET #0, (i) a demodulation-reference signal (DM-RS) antenna port for a physical downlink control channel (PDCCH) reception in the CORESET #0 is quasi co-located with a channel state information reference signal (CSI-RS) informed by the TCI state, and (ii) quasi co-location-type D (QCL-type D) of the CSI-RS is provided by a synchronization signal/physical broadcast channel block (SSB).

8. The processor of claim 7, wherein the QCL-type D of the CSI-RS is determined based on the SSB.

9. The processor of claim 7, wherein the CORESET #0 is set by information which is transmitted through a physical broadcast channel (PBCH).

10. The method of claim 1, wherein the QCL-type D is related to a spatial reception parameter.

11. The UE of claim 4, wherein the QCL-type D is related to a spatial reception parameter.

12. The processor of claim 7, wherein the QCL-type D is related to a spatial reception parameter.

* * * * *